(12) United States Patent
Woo et al.

(10) Patent No.: US 12,236,099 B2
(45) Date of Patent: Feb. 25, 2025

(54) ACCELERATOR MODULE AND COMPUTING SYSTEM INCLUDING THE SAME

(71) Applicant: Samsung Electronics Co., Ltd., Suwon-si (KR)

(72) Inventors: Kyoungwan Woo, Suwon-si (KR); Kyungsoo Kim, Suwon-si (KR); Yongsuk Kwon, Suwon-si (KR); Nayeon Kim, Suwon-si (KR); Jinin So, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 70 days.

(21) Appl. No.: 18/455,668

(22) Filed: Aug. 25, 2023

(65) Prior Publication Data

US 2024/0248609 A1 Jul. 25, 2024

(30) Foreign Application Priority Data

Jan. 20, 2023 (KR) .................. 10-2023-0008830

(51) Int. Cl.
*G06F 12/00* (2006.01)
*G06F 3/06* (2006.01)

(52) U.S. Cl.
CPC .......... *G06F 3/0613* (2013.01); *G06F 3/0659* (2013.01); *G06F 3/0683* (2013.01)

(58) Field of Classification Search
CPC .... G06F 3/0613; G06F 3/0659; G06F 3/0683; G06F 3/061; G06F 9/5083; G06F 9/505; G06F 9/4856; G06F 12/02; G06F 12/0806

See application file for complete search history.

(56) References Cited

U.S. PATENT DOCUMENTS

| | | | |
|---|---|---|---|
| 9,330,433 | B2 | 5/2016 | Koker et al. |
| 9,652,161 | B2 | 5/2017 | Mehra |
| 9,946,484 | B2 | 4/2018 | Regester et al. |
| 10,102,604 | B2 | 10/2018 | Koker et al. |
| 10,209,890 | B2 | 2/2019 | Haller et al. |
| 10,346,946 | B2 | 7/2019 | Koker et al. |
| 10,416,896 | B2 | 9/2019 | O et al. |
| 10,580,109 | B2 | 3/2020 | Koker et al. |
| 11,169,711 | B2 | 11/2021 | O et al. |
| 11,436,258 | B2 | 9/2022 | Bogdan et al. |
| 11,960,735 | B2 * | 4/2024 | Springberg ............. G06F 3/061 |

(Continued)

FOREIGN PATENT DOCUMENTS

| KR | 101913357 B1 | 10/2018 |
|---|---|---|
| KR | 102336294 B1 | 12/2021 |

*Primary Examiner* — Shawn X Gu
(74) *Attorney, Agent, or Firm* — Myers Bigel, P.A.

(57) ABSTRACT

An accelerator module includes a plurality of memories and a controller. The controller includes a plurality of memory controllers, a plurality of processing units, and a managing circuit. The plurality of memory controllers and the plurality of memories form a plurality of memory sub-channels. The plurality of processing units perform computational operations on a plurality of data stored in or read from the plurality of memories. The managing circuit redistributes tasks performed by the plurality of processing units or changes connections between the plurality of memory controllers and the plurality of processing units in response to a first memory sub-channel and a first processing unit being in a heavy-workload state.

20 Claims, 31 Drawing Sheets

(56) References Cited

U.S. PATENT DOCUMENTS

| | | |
|---|---|---|
| 2008/0101236 A1 | 5/2008 | Miyamoto |
| 2010/0122022 A1* | 5/2010 | Luo .................... G06F 12/0246 |
| | | 711/E12.001 |
| 2019/0212918 A1 | 7/2019 | Wang et al. |
| 2021/0271680 A1 | 9/2021 | Lee et al. |
| 2021/0374056 A1 | 12/2021 | Malladi et al. |
| 2022/0107743 A1 | 4/2022 | Yang et al. |
| 2022/0114032 A1 | 4/2022 | Guim Bernat et al. |
| 2022/0166445 A1 | 5/2022 | Chiang |
| 2022/0188151 A1* | 6/2022 | Muthiah ............... G06F 3/0611 |
| 2022/0276914 A1 | 9/2022 | Kundu et al. |

* cited by examiner

FIG. 6A

PU_1/SCH_1: | TSK11 | TSK12 | TSK13 | TSK14 | TSK15 | TSK16 | TSK17 | TSK18 |

PU_2/SCH_2: | TSK21 | TSK22 |

PU_3/SCH_3: | TSK31 | TSK32 |

FIG. 8B

| | t1 | t2 | t3 | |
|---|---|---|---|---|
| PU_1/SCH_1: | TSK11 | TSK12 | | TSK13 | TSK14 |
| PU_2/SCH_2: | TSK21 | TSK22 | LOAD BALANCING | TSK15 | TSK16 |
| PU_3/SCH_3: | TSK31 | TSK32 | | TSK17 | TSK18 |

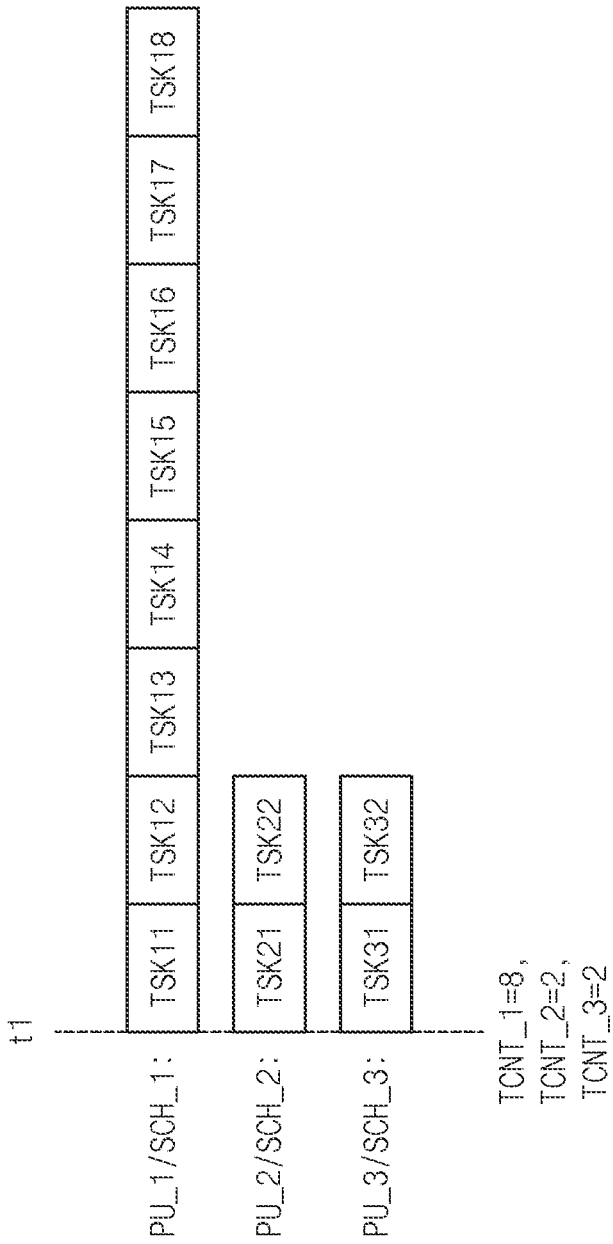

FIG. 10B

|  | t1 | t4 | | | | |
|---|---|---|---|---|---|---|
| PU_1/SCH_1: | | | TSK11 | TSK12 | TSK13 | TSK14 |
| PU_2/SCH_2: | | LOAD BALANCING | TSK21 | TSK22 | TSK15 | TSK16 |
| PU_3/SCH_3: | | | TSK31 | TSK32 | TSK17 | TSK18 |

FIG. 13C

| DATA | HPA | DPA |
|---|---|---|
| DAT1A | HPA_1A | DPA_M1_1A |
| DAT1B | HPA_1B | DPA_M1_1B |
| DAT1C | HPA_1C | DPA_M1_1C |
| DAT2A | HPA_2A | DPA_M2_2A |
| DAT2B | HPA_2B | DPA_M2_2B |
| DAT2C | HPA_2C | DPA_M2_2C |
| DAT3A | HPA_3A | DPA_M3_3A |
| DAT3B | HPA_3B | DPA_M3_3B |
| DAT3C | HPA_3C | DPA_M3_3C |
| DAT3D | HPA_3D | DPA_M3_3D |
| DAT3E | HPA_3E | DPA_M3_3E |
| DAT3F | HPA_3F | DPA_M3_3F |
| DAT3G | HPA_3G | DPA_M3_3G |
| DAT3H | HPA_3H | DPA_M3_3H |

FIG. 15C

| DATA | HPA | DPA |
|---|---|---|
| DAT1A | HPA_1A | DPA_M1_1A |
| DAT1B | HPA_1B | DPA_M1_1B |
| DAT1C | HPA_1C | DPA_M1_1C |
| DAT2A | HPA_2A | DPA_M1_2A |
| DAT2B | HPA_2B | DPA_M1_2B |
| DAT2C | HPA_2C | DPA_M1_2C |
| DAT3A | HPA_3A | DPA_M2_3A |
| DAT3B | HPA_3B | DPA_M2_3B |
| DAT3C | HPA_3C | DPA_M2_3C |
| DAT3D | HPA_3D | DPA_M2_3D |
| DAT3E | HPA_3E | DPA_M3_3E |
| DAT3F | HPA_3F | DPA_M3_3F |
| DAT3G | HPA_3G | DPA_M3_3G |
| DAT3H | HPA_3H | DPA_M3_3H |

ACCELERATOR MODULE AND COMPUTING SYSTEM INCLUDING THE SAME

CROSS-REFERENCE TO RELATED APPLICATION(S)

This application claims priority under 35 U.S.C. § 119 to Korean Patent Application No. 10-2023-0008830 filed on Jan. 20, 2023 in the Korean Intellectual Property Office, the disclosure of which is herein incorporated by reference in its entirety.

BACKGROUND

Example embodiments of the present disclosure relate generally to semiconductor integrated circuits, and more particularly to accelerator modules and computing systems including the accelerator modules.

Computing systems may provide various information technology (IT) services to users. As various IT services are provided to the user, the amount of data that are processed by the computing systems increases. The computing systems are developing into heterogeneous computing environments to provide various IT services. Nowadays, various technologies for processing data at a high speed within the computing systems and/or the heterogeneous computing environments are being developed.

A computing system may include a host device for processing data based on executed instructions or programs. Due to size and memory constraints, the computing system may include a storage device for storing the instructions (or programs) and data. In this case, the instructions and data are transmitted from the storage device to the host device, and the host device processes the data based on the instructions. However, this communication between the host device and the storage device may serve as a bottleneck for the operating speed of the computing system.

SUMMARY

Aspects according to one or more embodiments of the inventive concept beneficially improve the speed at which data is processed. At least one example embodiment of the present disclosure provides an accelerator module capable of efficiently allocating, distributing and processing tasks and/or workloads while performing both data storage function and data processing function.

At least one example embodiment of the present disclosure provides a computing system including the accelerator module.

According to example embodiments, an accelerator module includes a plurality of memories and a controller that controls operations of the plurality of memories. The controller includes a plurality of memory controllers connected to the plurality of memories, a plurality of processing units connected to the plurality of memory controllers, and a managing circuit connected to the plurality of processing units. The plurality of memory controllers and the plurality of memories form a plurality of memory sub-channels. The plurality of memory sub-channels include a first memory sub-channel. The plurality of processing units may perform computational operations on a plurality of data stored in or read from the plurality of memories, and include a first processing unit connected to the first memory sub-channel. The managing circuit may redistribute tasks performed by the plurality of processing units or may change connections between the plurality of memory controllers and the plurality of processing units in response to the first memory sub-channel and the first processing unit being in a heavy-workload state.

According to example embodiments, a computing system includes a host device, a memory device that communicates with the host device through a first interface, and a first accelerator module that communicates with the host device through a second interface. The first accelerator module includes a plurality of memories and a controller that controls operations of the plurality of memories. The controller includes a plurality of memory controllers connected to the plurality of memories, a plurality of processing units connected to the plurality of memory controllers, and a managing circuit connected to the plurality of processing units. The plurality of memory controllers and the plurality of memories form a plurality of memory sub-channels. The plurality of memory sub-channels include a first memory sub-channel. The plurality of processing units perform computational operations on a plurality of data stored in or read from the plurality of memories, and include a first processing unit connected to the first memory sub-channel. The managing circuit redistributes tasks performed by the plurality of processing units or changes connections between the plurality of memory controllers and the plurality of processing units in response to the first memory sub-channel and the first processing unit being in a heavy-workload state.

According to example embodiments, an accelerator module includes a plurality of memories and a controller that controls operations of the plurality of memories. The controller includes a plurality of memory controllers connected to the plurality of memories, a plurality of processing units connected to the plurality of memory controllers, and a managing circuit connected to the plurality of processing units. The plurality of memory controllers and the plurality of memories form a plurality of memory sub-channels. The plurality of memory sub-channels include a first memory sub-channel, a second memory sub-channel and a third memory sub-channel. The plurality of processing units perform computational operations on a plurality of data stored in or read from the plurality of memories, and include a first processing unit connected to the first memory sub-channel and a second processing unit connected to the second memory sub-channel. The managing circuit performs at least one of a load balancing operation and a channel connection changing operation in response to the first memory sub-channel and the first processing unit being in a heavy-workload state. In the load balancing operation, the managing circuit reallocates a first task among tasks allocated to the first processing unit to the second processing unit, copies first data associated with the first task and stored in the first memory sub-channel to the second memory sub-channel, and performs the first task using the second processing unit and the second memory sub-channel. In the channel connection changing operation, the managing circuit additionally connects the second memory sub-channel with the first processing unit, copies the first data stored in the first memory sub-channel to the second memory sub-channel, connects the second processing unit, which was previously connected to the second memory sub-channel, with the third memory sub-channel, copies second data stored in the second memory sub-channel to the third memory sub-channel, and changes address mapping information to access the first data stored in the second memory sub-channel rather than the first data stored in the first memory sub-channel when the first data is to be accessed by an external host device.

In the accelerator module and the computing system according to example embodiments, the workload management operation may be performed when the specific processing unit is in the heavy-workload state. For example, the load balancing operation may be performed to redistribute tasks such that all memory sub-channels and all processing units have an equal workload. For example, the channel connection changing operation may be performed to change the connections between the processing units and the memory sub-channels such that an additional memory sub-channel is allocated to a processing unit with heavy workloads to perform tasks quickly and such that a memory sub-channel is shared by processing units with light workloads to perform tasks slowly. Accordingly, the internal memory bandwidth may be dynamically/adaptively controlled, and the accelerator module 100 may operate with improved performance.

BRIEF DESCRIPTION OF THE DRAWINGS

Illustrative, non-limiting example embodiments will be more clearly understood from the following detailed description taken in conjunction with the accompanying drawings, wherein like reference numerals (when used) indicate corresponding elements throughout the several views, and in which:

FIGS. 6A and 6B are diagrams for conceptually describing an operation of the example method shown in FIG. 5;

FIGS. 8A, 8B and 8C are diagrams for describing an operation of FIG. 7;

FIGS. 10A and 10B are diagrams for describing an operation of FIG. 9;

FIGS. 13A, 13B and 13C are diagrams for describing an operation of the example method shown in FIG. 12;

FIGS. 15A, 15B and 15C are diagrams for describing operations of FIGS. 14A and 14B;

DETAILED DESCRIPTION

Figure 1:
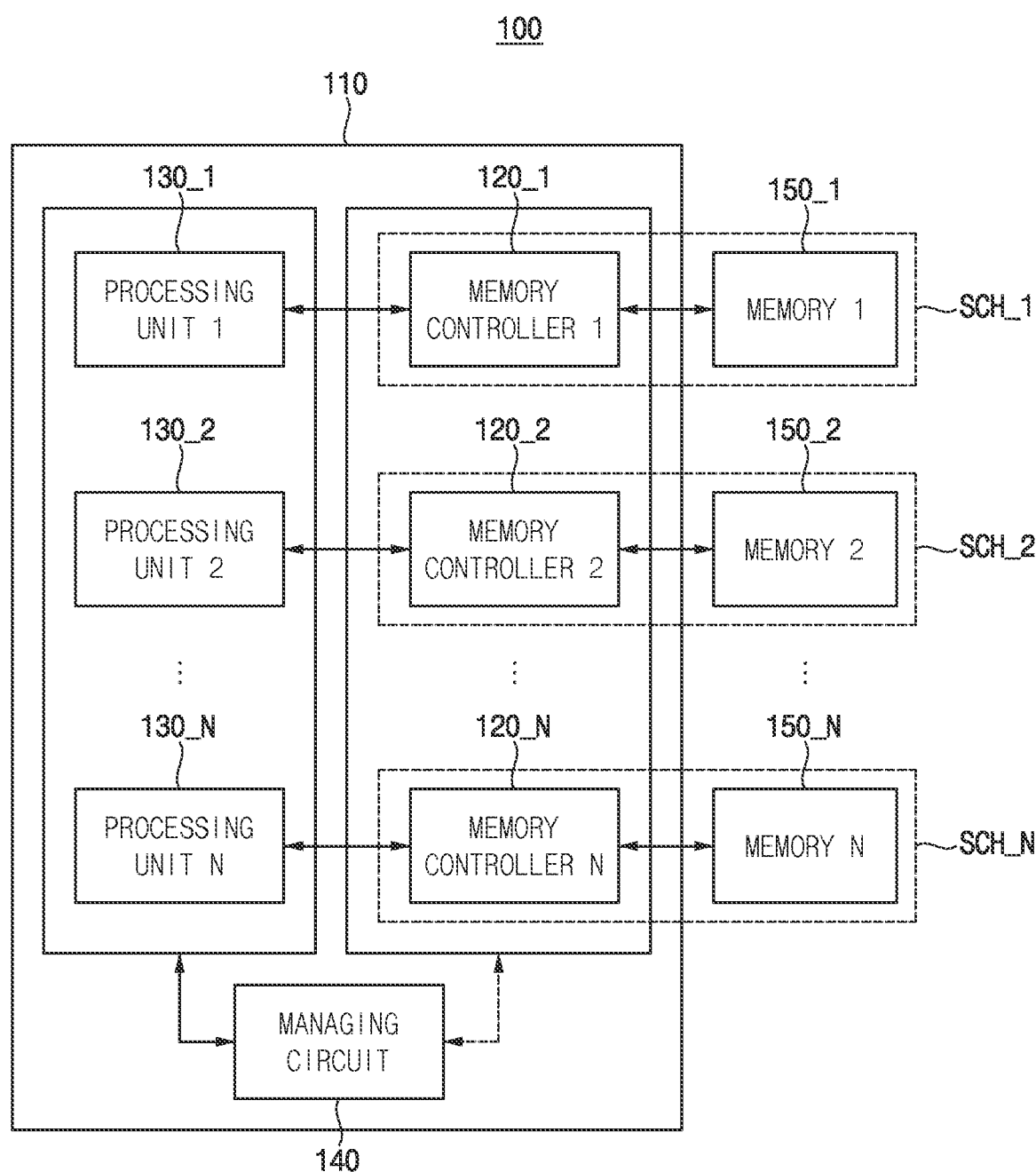
FIG. 1 is a block diagram illustrating an example accelerator module, according to one or more embodiments.

Various example embodiments will be described more fully with reference to the accompanying drawings, in which embodiments of the inventive concept are shown. The present disclosure may, however, be embodied in many different forms and should not be construed as limited to the embodiments set forth herein. Like reference numerals refer to like elements throughout this application.

FIG. 1 is a block diagram illustrating at least a portion of an example accelerator module according to one or more embodiments.

Referring to FIG. 1, an accelerator module 100 includes a controller 110 and a plurality of memories (MEMs) 150_1, 150_2, . . . , 150_N, where N is an integer greater than 1 and corresponds to the number of memories in the accelerator module 100.

The accelerator module 100 may be included in a computing system that includes a host device (e.g., a central processing unit (CPU), etc.), not explicitly shown in FIG. 1. The accelerator module 100 may operate under the control of the host device, and may store data. Unlike a conventional memory device (e.g., a dynamic random access memory (DRAM) device) that may only perform a data storage function, the accelerator module 100 may perform both a data storage function and a data processing function together. For example, the accelerator module 100 may include at least one of various elements or components that perform data processing.

In some example embodiments, the accelerator module 100 may communicate with the host device through an interface the same as that of a conventional memory device. For example, the accelerator module 100 may be implemented in the form of an acceleration dual in-line memory module (DIMM) in which an artificial intelligence (AI) engine is mounted on a DRAM module. For example, the acceleration DIMM may be referred to as an AXDIMM.

In some example embodiments, the accelerator module 100 may communicate with the host device through an interface different from that of a conventional memory device. In this example, the accelerator module 100 may be connected to the host device without adding memory channels to the host device and may be additionally installed in the computing system regardless of conventional or existing memory technologies, and thus the memory capacity and the memory bandwidth of the computing system may efficiently increase. For example, the accelerator module 100 may be implemented in the form of a memory expander that is established based on a compute express link (CXL) protocol and equipped with a near memory processing (NMP) function. For example, the memory expander may be referred to as a CXL-NMP.

However, example embodiments are not limited thereto, and the accelerator module 100 may be implemented in at least one of various forms that simultaneously perform the data storage function and the data processing function. The computing system including the accelerator module 100 will be described with reference to FIG. 17 through 20.

The plurality of memories 150_1 to 150_N are connected to the controller 110, are controlled by the controller 110, and store a plurality of data. For example, the plurality of memories 150_1 to 150_N may include first to N-th memories 150_1 to 150_N, where N is a natural number greater than or equal to two.

In some example embodiments, each of the plurality of memories 150_1 to 150_N may be or may include a volatile memory such as a DRAM. In some example embodiments, each of the plurality of memories 150_1 to 150_N may be or may include a nonvolatile memory such as a flash memory. An example of each of the plurality of memories 150_1 to 150_N will be described with reference to FIGS. 2A and 2B.

The controller 110 may control overall operations of the accelerator module 100, may be connected to the plurality of memories 150_1 to 150_N, and may control operations of the plurality of memories 150_1 to 150_N. An example of the controller 110 will be described in further detail with reference to FIG. 3.

The controller 110 may include a plurality of memory controllers (MCs) 120_1, 120_2, . . . , 120_N, a plurality of processing units (PUs) 130_1, 130_2, . . . , 130_N, and a managing circuit (MNG) 140.

The plurality of memory controllers 120_1 to 120_N are connected to the plurality of memories 150_1 to 150_N, and may control operations of the plurality of memories 150_1 to 150_N. The plurality of memory controllers 120_1 to 120_N and the plurality of memories 150_1 to 150_N, considered together, may form a plurality of memory sub-channels SCH_1, SCH_2, . . . , SCH_N. The term "memory sub-channel" may be referred to herein as a memory channel, a sub-channel, a media channel, etc. A structure including the plurality of memory sub-channels SCH_1 to SCH_N may be referred to as a multi sub-channel structure.

For example, the plurality of memory controllers 120_1 to 120_N may include first to N-th memory controllers 120_1 to 120_N, and the plurality of memory sub-channels SCH_1 to SCH_N may include first to N-th memory sub-channels SCH_1 to SCH_N. For example, the first memory controller 120_1 may be connected to the first memory 150_1 and may control an operation of the first memory 150_1, and the first memory controller 120_1 and the first memory 150_1 may form the first memory sub-channel SCH_1. Structures of the plurality of memory sub-channels SCH_1 to SCH_N, e.g., connections between the plurality of memory controllers 120_1 to 120_N and the plurality of memories 150_1 to 150_N may not be changed and may be fixed.

Although FIG. 1 illustrates an example where one memory sub-channel includes only one memory controller and one memory connected thereto, example embodiments are not limited thereto. For example, one memory sub-channel may include one memory controller and two or more memories connected thereto.

The plurality of processing units 130_1 to 130_N may be connected to the plurality of memory controllers 120_1 to 120_N, respectively, and may be configured to perform computational operations (e.g., calculations, arithmetic operations, or computations) on the plurality of data stored in or read from the plurality of memories 150_1 to 150_N. In other words, the plurality of processing units 130_1 to 130_N may perform the computational operations interoperable with or in conjunction with the plurality of memory sub-channels SCH_1 to SCH_N while data write and/or read operations are performed. For example, the processing unit may be referred to as a near memory processing unit (NMPU).

For example, the plurality of processing units 130_1 to 130_N may include the first to N-th processing units 130_1 to 130_N. For example, the first processing unit 130_1 may be connected to the first memory controller 120_1 and may perform a computational operation on data stored in or read from the first memory 150_1.

In some example embodiments, the plurality of processing units 130_1 to 130_N may perform and/or execute computational operations, tasks (or jobs), applications, etc., off-loaded from the host device. The term "off-loading" as used herein is intended to refer broadly to transferring resource-intensive computational tasks to a separate processor, such as a hardware accelerator, or to an external platform, such as a cluster, grid, or a cloud. Off-loading an application such as an image rendering application or a mathematical computation to a co-processor is used to accelerate the application or mathematical computation. Off-loading applications and computations to an external platform over a network may provide increased computing power and help to overcome hardware limitations of a device, such as limited computational power, storage, and energy.

The managing circuit 140, in one or more embodiments, is connected to the plurality of processing units 130_1 to 130_N, and may be configured to perform a workload management operation to resolve a heavy-workload state when a specific processing unit (or multiple processing units) among the plurality of processing units 130_1 to 130_N is in the heavy-workload state or when workloads are concentrated on the specific processing unit. The term "heavy-workload state" as used herein is intended to refer broadly to a condition wherein a workload of a specific processing unit, or other circuit or component, exceeds a prescribed (i.e., reference) workload; the "workload" may be measured as a function of the number of computational operations or other tasks or actions being performed or requested to be performed. For example, when the workload management operation is performed, internal memory bandwidths of the plurality of memory sub-channels SCH_1 to SCH_N may be dynamically and adaptively set, and thus the workload management operation may be referred to as an internal memory bandwidth control operation. In some example embodiments, the managing circuit 140 may be further connected to the plurality of memory controllers 120_1 to 120_N.

In some example embodiments, as will be described with reference to FIG. 4, when the specific processing unit is in the heavy-workload state, e.g., when a workload of the specific processing unit is larger than a reference workload, the managing circuit 140 may redistribute tasks and/or computational operations that are allocated/distributed to the plurality of processing units 130_1 to 130_N and performed by the plurality of processing units 130_1 to 130_N. In other words, the managing circuit 140 may perform a load balancing operation in which workloads are allocated or assigned as evenly as possible to the plurality of processing units 130_1 to 130_N. In this example, connections between the plurality of processing units 130_1 to 130_N and the plurality of memory controllers 120_1 to 120_N may not be changed and may be fixed.

In some example embodiments, as will be described with reference to FIG. 11, when the specific processing unit is in the heavy-workload state, e.g., when the workload of the specific processing unit is larger than the reference workload, the managing circuit 140 may change the connections between the plurality of processing units 130_1 to 130_N and the plurality of memory controllers 120_1 to 120_N, e.g., may change connections between the plurality of processing units 130_1 to 130_N and the plurality of memory sub-channels SCH_1 to SCH_N. In other words, the managing circuit 140 may perform a channel connection changing (i.e., reconfiguration) operation in which a memory sub-channel connected or allocated to each of the plurality of processing units 130_1 to 130_N is changed (i.e., reconfigured). In this example, the connections between the plurality of processing units 130_1 to 130_N and the plurality of memory controllers 120_1 to 120_N may not be fixed and may be changed (e.g., as a function of the measured workloads of the respective plurality of processing units 130_1 to 130_N).

In some example embodiments, the managing circuit 140 may perform both the load balancing operation and the channel connection changing/reconfiguration operation together.

In some example embodiments, the load balancing operation and/or the channel connection changing operation may be performed under the control of the host device, e.g., based on the external control. In some example embodiments, the load balancing operation and/or the channel connection changing operation may be performed by the managing circuit 140 by itself, e.g., based on the internal control.

In some example embodiments, the host device may execute a deep-learning recommendation system (DLRS) or a deep-learning recommendation model (DLRM), and the accelerator module 100 may be used to execute the deep-learning recommendation system or model.

The accelerator module 100 according to example embodiments may be implemented with a structure having a processing unit for each memory sub-channel, and may include the managing circuit 140 that performs the workload management operation when the specific processing unit is in the heavy-workload state. For example, the load balancing operation may be performed to redistribute tasks such that all memory sub-channels and all processing units have an equal workload, or at least such that none of the memory sub-channels and none of the processing units are in the heavy-workload state. For example, the channel connection changing operation may be performed to change the connections between the processing units and the memory sub-channels such that an additional memory sub-channel is allocated to a processing unit with heavy workloads to perform tasks quickly and such that a memory sub-channel is shared by processing units with light workloads to perform tasks slowly. Accordingly, the internal memory bandwidth may be dynamically/adaptively controlled, and the accelerator module 100 may operate with improved performance.

Figure 2A:
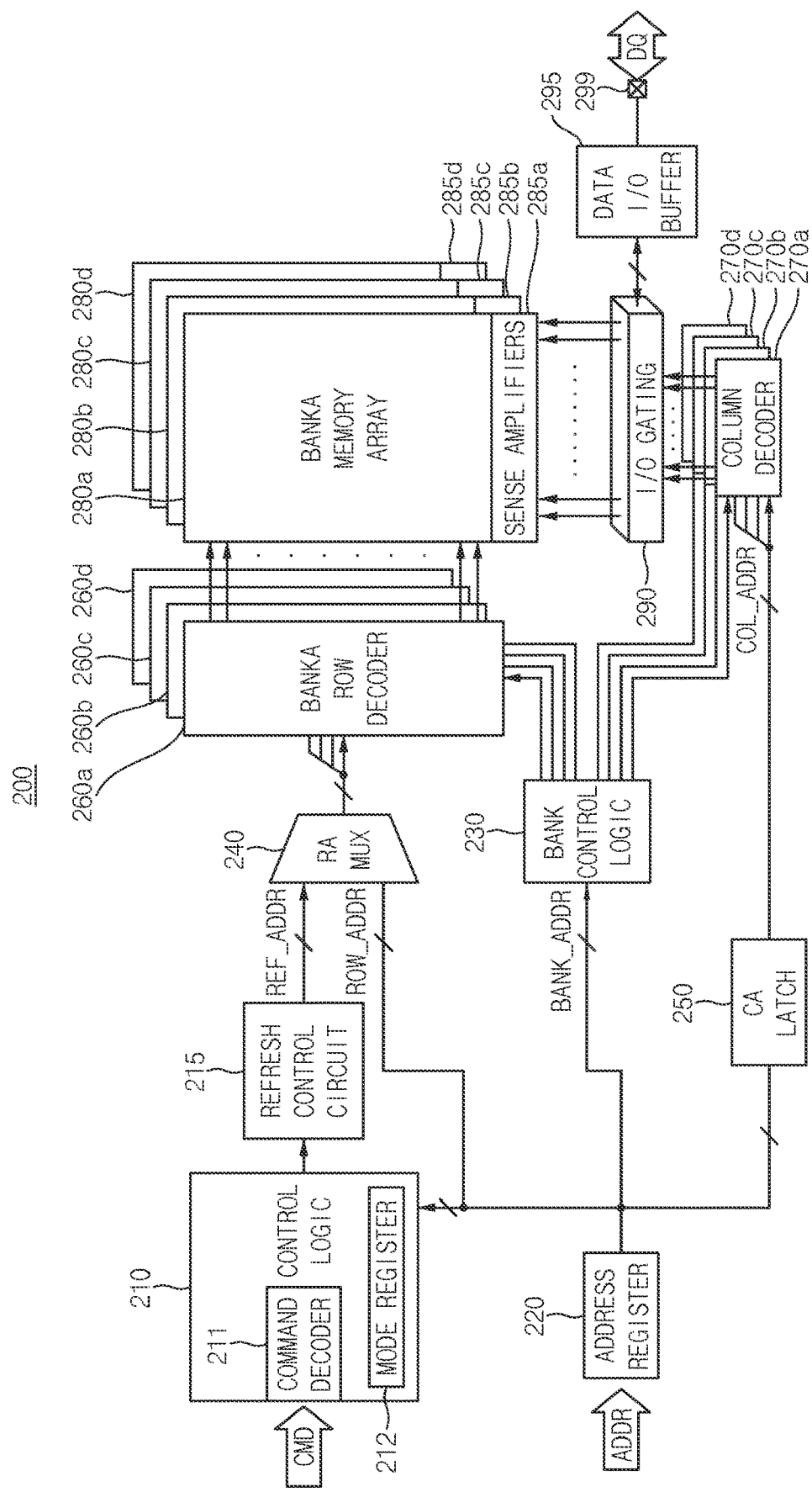
FIGS. 2A and 2B are block diagrams illustrating examples of a memory that may be included in an accelerator module, according to one or more embodiments.
Figure 2B:
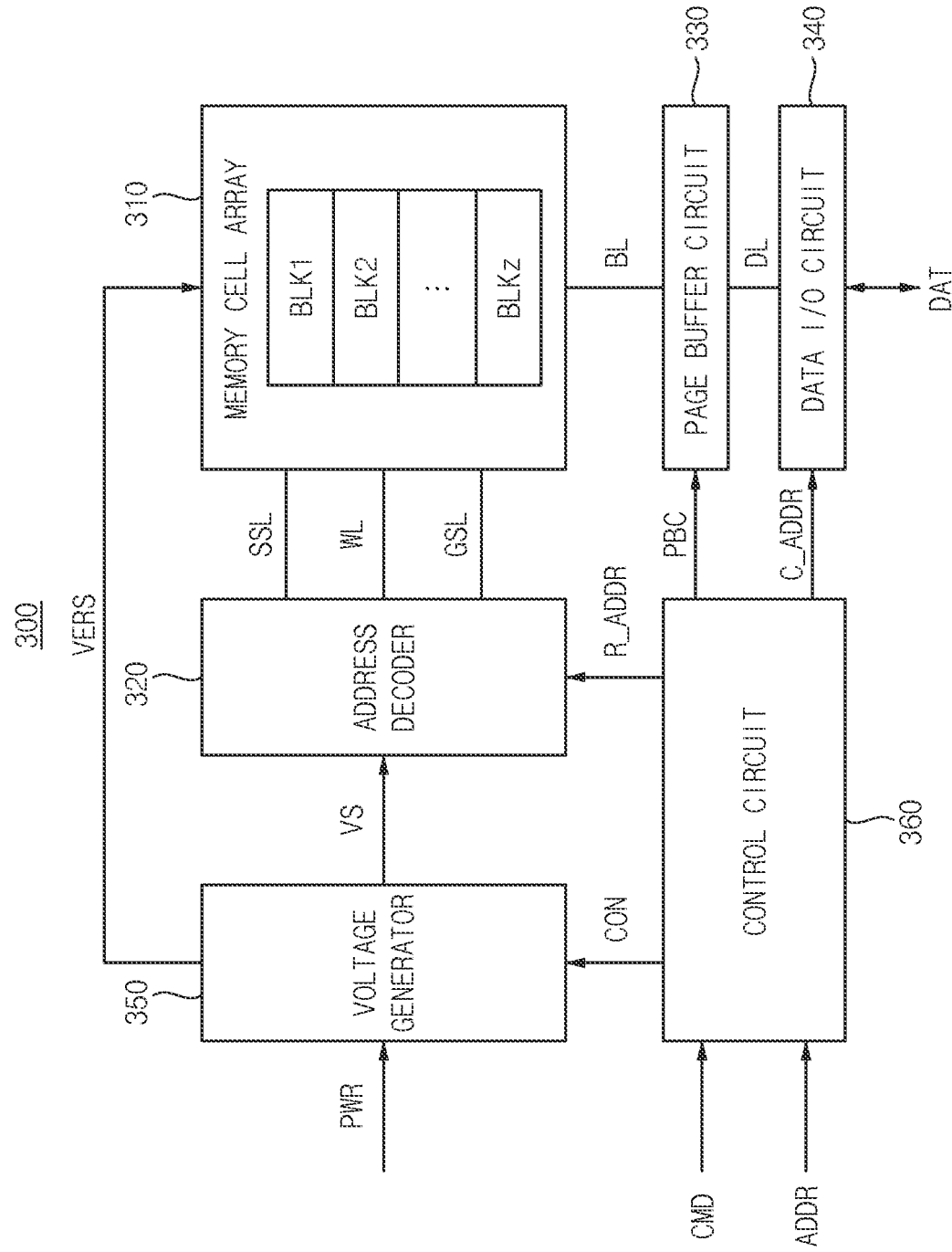

FIGS. 2A and 2B are block diagrams illustrating examples of a memory included in an accelerator module according to one or more embodiments.

Referring to FIG. 2A, a memory 200 includes a control logic 210, a refresh control circuit 215, an address register 220, a bank control logic 230, a row address multiplexer (RA MUX) 240, a column address (CA) latch 250, a row decoder, a column decoder, a memory cell array, a sense amplifier unit, an input/output (I/O) gating circuit 290, a data I/O buffer 295 and a data I/O pad 299. For example, the memory 200 may be one of various volatile memories such as a DRAM.

The memory cell array may include a plurality of memory cells. The memory cell array may include a plurality of bank arrays, e.g., first to fourth bank arrays 280a, 280b, 280c and 280d. The row decoder may include a plurality of bank row decoders, e.g., first to fourth bank row decoders 260a, 260b, 260c and 260d connected to the first to fourth bank arrays 280a to 280d, respectively. The column decoder may include a plurality of bank column decoders, e.g., first to fourth bank column decoders 270a, 270b, 270c and 270d connected to the first to fourth bank arrays 280a to 280d, respectively. The sense amplifier unit may include a plurality of bank sense amplifiers, e.g., first to fourth bank sense amplifiers 285a, 285b, 285c and 285d connected to the first to fourth bank arrays 280a to 280d, respectively. It is to be understood that although four bank arrays may be shown in the example memory 200 of FIG. 2A, embodiments of the inventive concept are not limited to any specific number of bank arrays or corresponding row decoders, column decoders, or sense amplifiers.

The first to fourth bank arrays 280a to 280d, the first to fourth bank row decoders 260a to 260d, the first to fourth bank column decoders 270a to 270d, and the first to fourth bank sense amplifiers 285a to 285d may form first to fourth banks, respectively. For example, the first bank array 280a, the first bank row decoder 260a, the first bank column decoder 270a, and the first bank sense amplifier 285a may form the first bank; the second bank array 280b, the second bank row decoder 260b, the second bank column decoder 270b, and the second bank sense amplifier 285b may form the second bank; the third bank array 280c, the third bank row decoder 260c, the third bank column decoder 270c, and the third bank sense amplifier 285c may form the third bank; and the fourth bank array 280d, the fourth bank row decoder 260d, the fourth bank column decoder 270d, and the fourth bank sense amplifier 285d may form the fourth bank.

The address register 220 may be configured to receive an address ADDR including a bank address BANK_ADDR, a row address ROW_ADDR and a column address COL_ADDR from a controller (e.g., from the controller 110 in FIG. 1) located outside the memory 200. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to receipt of the bank address BANK_ADDR. One of the first to fourth bank row decoders 260a to 260d corresponding to the received bank address BANK_ADDR may be activated in response to the bank control signals generated by the bank control logic 230, and one of the first to fourth bank column decoders 270a to 270d corresponding to the received bank address BANK_ADDR may be activated in response to the bank control signals generated by the bank control logic 230.

The refresh control circuit 215 may generate a refresh address REF_ADDR in response to receipt of a refresh command or entrance of any self-refresh mode. For example, the refresh control circuit 215 may include a refresh counter that is configured to sequentially change the refresh address REF_ADDR from a first address of the memory cell array to a last address of the memory cell array. The refresh control circuit 215 may receive control signals from the control logic 210.

The row address multiplexer 240 may receive the row address ROW_ADDR from the address register 220, and may receive the refresh address REF_ADDR from the refresh control circuit 215. The row address multiplexer 240 may selectively output the row address ROW_ADDR or the refresh address REF_ADDR. A row address (e.g., the row address ROW_ADDR or the refresh address REF_ADDR)

output from the row address multiplexer 240 may be applied to the first to fourth bank row decoders 260a to 260d.

The activated one of the first to fourth bank row decoders 260a to 260d may decode the row address output from the row address multiplexer 240, and may activate a wordline corresponding to the row address. For example, the activated bank row decoder may apply a wordline driving voltage to the wordline corresponding to the row address.

The column address latch 250 may receive the column address COL_ADDR from the address register 220, and may at least temporarily store the received column address COL_ADDR. The column address latch 250 may apply the temporarily stored or received column address COL_ADDR to the first to fourth bank column decoders 270a to 270d.

The activated one of the first to fourth bank column decoders 270a to 270d may decode the column address COL_ADDR output from the column address latch 250, and may control the I/O gating circuit 290 to output data corresponding to the column address COL_ADDR.

The I/O gating circuit 290 may include circuitry for gating I/O data. For example, although not explicitly shown (but is implied), the I/O gating circuit 290 may include an input data mask logic, read data latches for storing data output from the first to fourth bank arrays 280a to 280d, and/or write drivers for writing data to the first to fourth bank arrays 280a to 280d.

Data DQ to be read from one of the first to fourth bank arrays 280a to 280d may be sensed by a sense amplifier coupled to the one bank array, and may be stored in the read data latches. The data DQ stored in the read data latches may be provided to the controller via the data I/O buffer 295 and the data I/O pad 299. Data DQ received via the data I/O pad 299 that are to be written to one of the first to fourth bank arrays 280a to 280d may be provided from the controller to the data I/O buffer 295. The data DQ received via the data I/O pad 299 and provided to the data I/O buffer 295 may be written to the one bank array via the write drivers in the I/O gating circuit 290.

The control logic 210 may control an operation of the memory 200. For example, the control logic 210 may generate control signals for the memory 200 to perform a data write operation or a data read operation. The control logic 210 may include a command decoder 211 that decodes a command CMD received from the controller and a mode register 212 that sets an operation mode of the memory 200.

Referring to FIG. 2B, a memory 300 may include a memory cell array 310, an address decoder 320, a page buffer circuit 330, a data input/output (I/O) circuit 340, a voltage generator 350 and a control circuit 360. For example, the memory 300 may be one of various nonvolatile memories such as a NAND flash memory.

The memory cell array 310 may be connected to the address decoder 320 via a plurality of string selection lines SSL, a plurality of wordlines WL and a plurality of ground selection lines GSL. The memory cell array 310 may be further connected to the page buffer circuit 330 via a plurality of bitlines BL. The memory cell array 310 may include a plurality of memory cells (e.g., a plurality of nonvolatile memory cells) that are connected to the plurality of wordlines WL and the plurality of bitlines BL (e.g., each of at least a subset of the memory cells being coupled to a unique pair of a corresponding wordline WL and bitline BL). The memory cell array 310 may be divided into a plurality of memory blocks BLK1, BLK2, . . . , BLKz each of which includes memory cells, where z is an integer greater than one representing the number of memory blocks in the memory cell array 310.

In some example embodiments, the plurality of memory cells may be arranged in a two-dimensional (2D) array structure or a three-dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 360 may receive a command CMD and an address ADDR from a controller (e.g., from the controller 110 in FIG. 1) located outside the memory 300, and may control erasure, programming and/or read operations of the memory 300 based on the command CMD and the address ADDR. An erasure operation may include performing a sequence of erase loops, and a programming operation may include performing a sequence of program loops. Each program loop may include a program operation and a program verification operation. Each erase loop may include an erase operation and an erase verification operation. The read operation may include a normal read operation and data recovery read operation.

For example, the control circuit 360 may generate control signals CON, which are used for controlling the voltage generator 350, and may generate control signal PBC for controlling the page buffer circuit 330, based on the command CMD, and may generate a row address R_ADDR and a column address C_ADDR based on the address ADDR. The control circuit 360 may provide the row address R_ADDR to the address decoder 320 and may provide the column address C_ADDR to the data I/O circuit 340.

The address decoder 320 may be connected to the memory cell array 310 via the plurality of string selection lines SSL, the plurality of wordlines WL and the plurality of ground selection lines GSL. For example, during the data erase/write/read operations, the address decoder 320 may determine at least one of the plurality of wordlines WL as a selected wordline, at least one of the plurality of string selection lines SSL as a selected string selection line, and at least one of the plurality of ground selection lines GSL as a selected ground selection line, based on the row address R_ADDR.

The voltage generator 350 may generate voltages VS that are required for an operation of the memory 300 based on a power PWR and the control signals CON supplied thereto. The voltages VS may be applied to the plurality of string selection lines SSL, the plurality of wordlines WL and the plurality of ground selection lines GSL via the address decoder 320. In addition, the voltage generator 350 may generate an erase voltage VERS supplied to the memory cell array 310 that is required for the erase operation based on the power PWR and the control signals CON.

The page buffer circuit 330 may be connected to the memory cell array 310 via the plurality of bitlines BL. The page buffer circuit 330 may include a plurality of page buffers. The page buffer circuit 330 may store data DAT to be programmed into the memory cell array 310 or may read data DAT sensed from the memory cell array 310. In other words, the page buffer circuit 330 may operate as a write driver (e.g., during a write operation) or as a sensing amplifier (e.g., during a read operation) according to an operation mode of the memory 300.

The data I/O circuit 340 may be connected to the page buffer circuit 330 via data lines DL. The data I/O circuit 340 may provide the data DAT from the outside of the memory 300 to the memory cell array 310 via the page buffer circuit 330 or may provide the data DAT from the memory cell array 310 to the outside of the memory 300, based on the column address C_ADDR.

Although the memory included in the accelerator module according to example embodiments is described based on a DRAM and a NAND flash memory, the memory according to example embodiments may be any volatile memory, and/or any nonvolatile memory, e.g., a static random access memory (SRAM), a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 3:
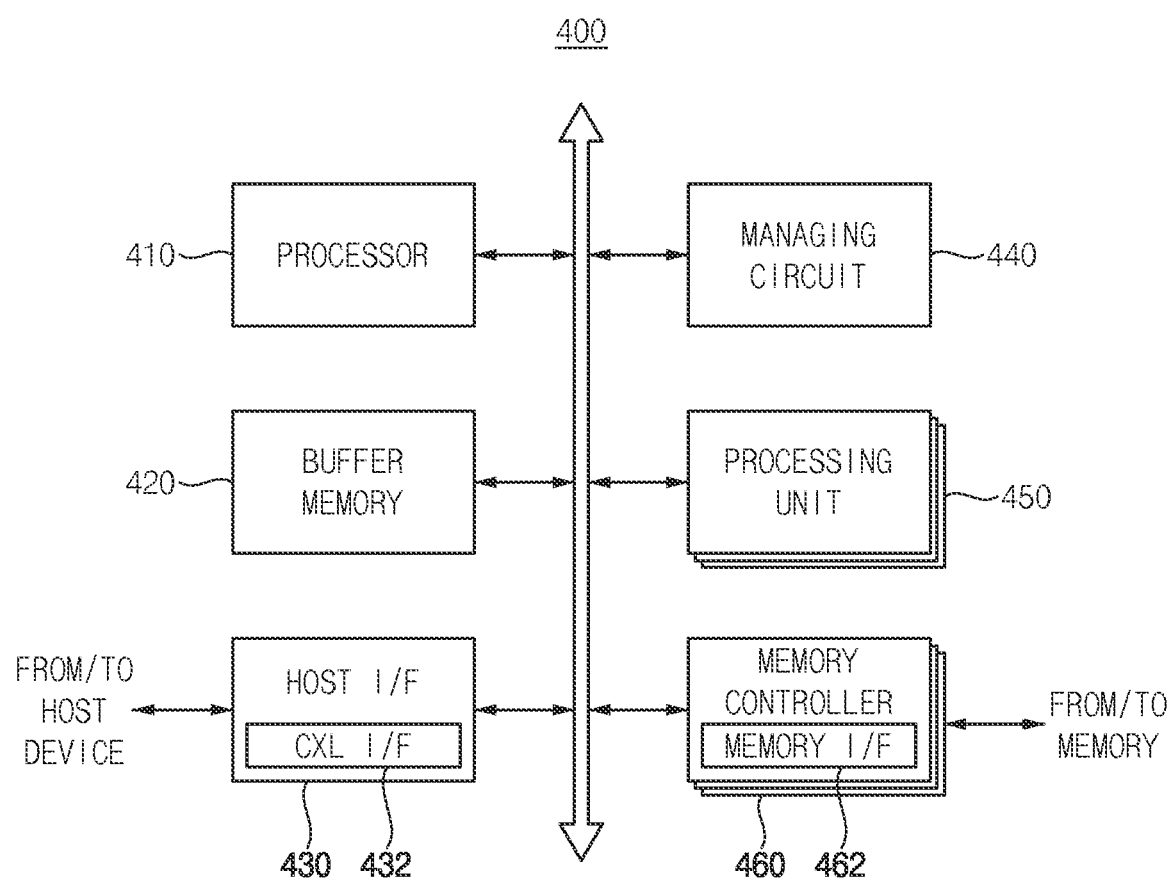
FIG. 3 is a block diagram illustrating at least a portion of an example controller that may be included in an accelerator module, according to one or more embodiments.

FIG. 3 is a block diagram illustrating at least a portion of an example controller 400 included in an accelerator module according to one or more embodiments.

Referring to FIG. 3, the controller 400 may include at least one processor 410, a buffer memory 420, a host interface (I/F) 430, a managing circuit 440, a plurality of processing units 450 and a plurality of memory controllers 460, coupled together via a bus or other interface connection arrangement.

The processor 410 may control an operation of the controller 400 in response to commands and/or requests received via the host interface 430 from a host device (e.g., a host device 510 in FIG. 17) located outside the controller 400. For example, the processor 410 may control an operation of an accelerator module (e.g., the accelerator module 100 of FIG. 1), and may control respective components by employing firmware for operating the accelerator module.

The buffer memory 420 may store instructions and data executed and processed by the processor 410. For example, the buffer memory 420 may be implemented with a volatile memory such as a DRAM, a SRAM, a cache memory, etc.

The host interface 430 may provide physical connections between the host device and the controller 400.

In some example embodiments, the controller 400 and the accelerator module may communicate with the host device through an interface the same as that of a conventional memory device. For example, the host interface 430 may provide an interface based on a peripheral component interconnect express (PCIe) protocol, a serial advanced technology attachment (SATA) protocol, a small computer small interface (SCSI) protocol, a serial attached SCSI (SAS) protocol, and/or the like.

In some example embodiments, the controller 400 and the accelerator module may communicate with the host device through an interface different from that of a conventional memory device. For example, the host interface 430 may provide an interface based on the CXL protocol. For example, the host interface 430 may include a CXL™ (a trademark of Compute Express Link Consortium, Inc.) interface 432 for supporting the CXL protocol.

The CXL protocol is an open standard for high-speed CPU-to-device and CPU-to-memory connections, designed for high performance data center computers. The CXL protocol is built on PCIe physical and electrical interface with protocols in three areas: input/output (I/O), memory, and cache coherence. An important feature of the CXL protocol is that it maintains memory coherency between the direct attached CPU memory (e.g., a DRAM) and the memory on the CXL device (e.g., an accelerator module), which means that the CPU and the CXL device see the same data seamlessly. For example, when the CXL protocol is applied or employed, the CPU may use both the CPU memory and the CXL device as a buffer memory.

Hereinafter, when the accelerator module communicates with the host device through the interface different from that of a conventional memory device, example embodiments will be described based on that a communication between the host device and the accelerator module is performed using the CXL interface, but example embodiments are not limited thereto. For example, the communication between the host device and the accelerator module may be performed using an interface implemented based on at least one of various protocols, such as a Gen-Z protocol, an NVLinkR (a registered trademark of NVIDIA Corporation) protocol, a cache coherent interconnect for accelerators (CCIX) protocol, an open coherent accelerator processor interface (CAPI) protocol, etc.

The managing circuit 440, the plurality of processing units 450 and the plurality of memory controllers 460 may be substantially the same as the managing circuit 140, the plurality of processing units 130_1 to 130_N and the plurality of memory controllers 120_1 to 120_N in FIG. 1, respectively. When the specific processing unit is in the heavy-workload state, the managing circuit 440 may perform the load balancing operation in which workloads are allocated as evenly as possible to the plurality of processing units 450, or may perform the channel connection changing operation in which connections between the plurality of processing units 450 and the plurality of memory controllers 460 are changed.

Each of the plurality of memory controllers 460 may include a memory interface 462 that provides a connection between the controller 400 and each of a plurality of memories (e.g., the plurality of memories 150_1 to 150_N in FIG. 1).

Figure 4:
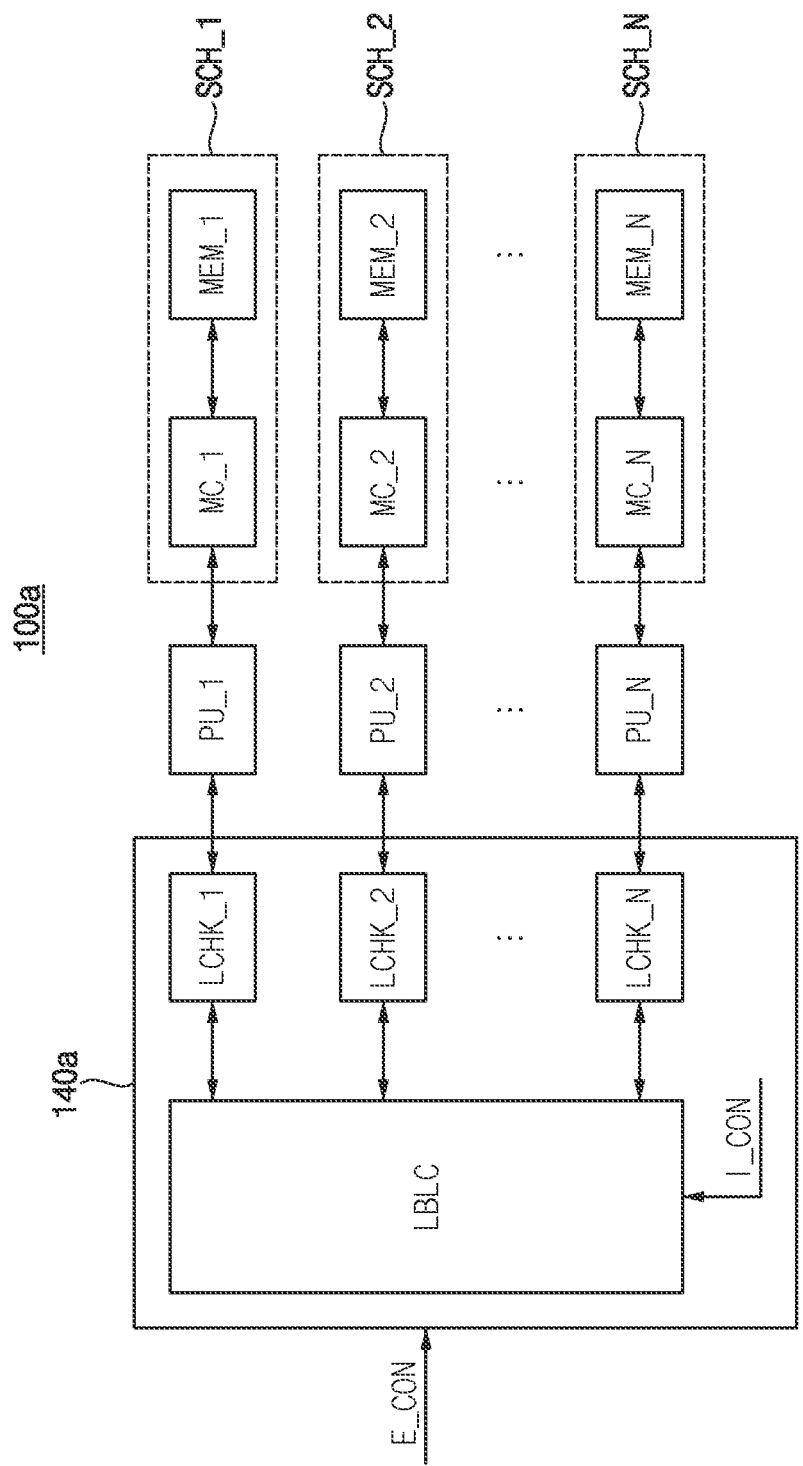
FIG. 4 is a block diagram illustrating an example of an accelerator module, according to one or more embodiments.

FIG. 4 is a block diagram illustrating at least a portion of an example accelerator module 100a, according to one or more embodiments.

Referring to FIG. 4, the accelerator module 100a may include a plurality of memories MEM_1, MEM_2, . . . , MEM_N, a plurality of memory controllers MC_1, MC_2, . . . , MC_N, a plurality of processing units PU_1, PU_2, . . . , PU_N, and a managing circuit 140a.

The plurality of memories MEM_1 to MEM_N, the plurality of memory controllers MC_1 to MC_N and the plurality of processing units PU_1 to PU_N may be substantially the same as the plurality of memories 150_1 to 150_N, the plurality of memory controllers 120_1 to 120_N and the plurality of processing units 130_1 to 130_N in FIG. 1, respectively, depicted in FIG. 1. The descriptions repeated with FIG. 1 will be omitted.

The managing circuit 140a may include a plurality of load checkers LCHK_1, LCHK_2, . . . , LCHK_N, and a load balancer LBLC. The managing circuit 140a may perform the load balancing operation among the workload management operation described with reference to FIG. 1.

The plurality of load checkers LCHK_1 to LCHK_N may be connected to the corresponding plurality of processing units PU_1 to PU_N, and may check (e.g., detect or sense) workloads of the plurality of processing units PU_1 to PU_N.

For example, the plurality of load checkers LCHK_1 to LCHK_N may include first to N-th load checkers LCHK_1 to LCHK_N. For example, the first load checker LCHK_1 may be connected to the first processing unit PU_1, and may check a workload of the first processing unit PU_1.

In some example embodiments, the plurality of load checkers LCHK_1 to LCHK_N may check the workloads of the plurality of processing units PU_1 to PU_N by checking access counts of the plurality of memory sub-channels SCH_1 to SCH_N connected to the plurality of processing units PU_1 to PU_N. In some example embodiments, the plurality of load checkers LCHK_1 to LCHK_N may check the workloads of the plurality of processing units PU_1 to PU_N by checking the number of tasks allocated to the plurality of processing units PU_1 to PU_N. An illustrative operation of checking the workloads will be described later.

When a specific processing unit among the plurality of processing units PU_1 to PU N is in the heavy-workload state, e.g., when a workload of the specific processing unit is larger than the reference workload, the load balancer LBLC in the managing circuit 140a may distribute or allocate a portion of the workload of the specific processing unit to at least one processing unit other than the specific processing unit among the plurality of processing units PU_1 to PU_N. For example, at least one of tasks allocated to the specific processing unit may be reallocated to another processing unit, and data associated with or related to the reallocated task may be copied from a specific memory sub-channel connected to the specific processing unit to another memory sub-channel connected to the other processing unit.

In some example embodiments, the above-described operation of the load balancer LBLC, e.g., a task reallocation operation and/or a data copy operation may be performed based on an external control signal E_CON. For example, the external control signal E_CON may be provided from an external host device (e.g., the host device 510 in FIG. 17). In some example embodiments, the above-described operation of the load balancer LBLC may be performed based on an internal control signal I_CON. For example, the internal control signal I_CON may be internally generated by the managing circuit 140a by itself, and may be generated when it is determined that the workloads are concentrated or focused on the specific processing unit by the plurality of load checkers LCHK_1 to LCHK_N and the load balancer LBLC.

Figure 5:
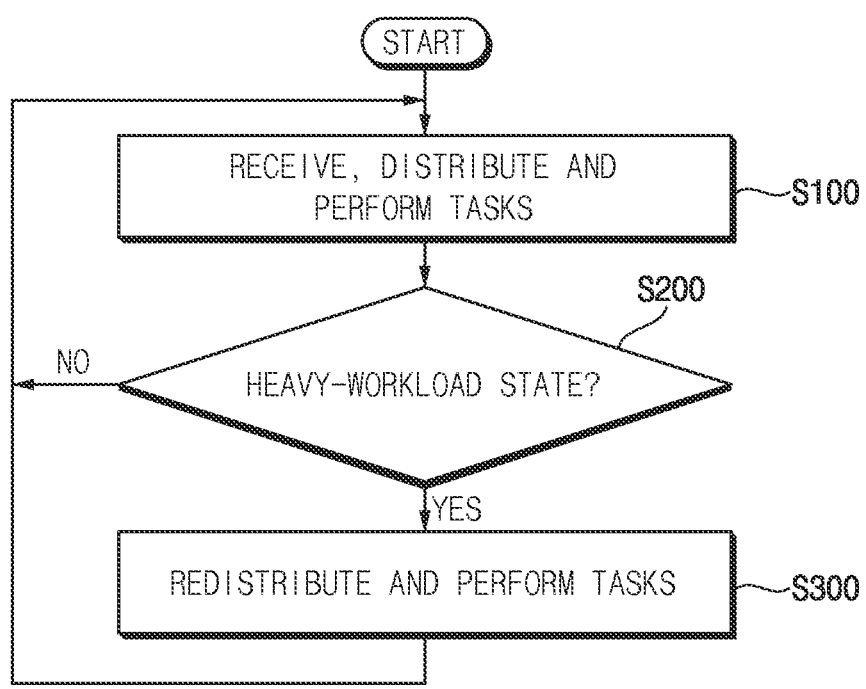
FIG. 5 is a flowchart illustrating at least a portion of an example method of operating an accelerator module of FIG. 4, according to one or more embodiments.

FIG. 5 is a flowchart illustrating at least a portion of an example method of operating an accelerator module of FIG. 4, according to one or more embodiments.

Referring to FIGS. 4 and 5, in a method of operating the accelerator module 100a, the managing circuit 140a and the plurality of processing units PU_1 to PU_N may receive tasks, the managing circuit 140a may distribute or allocate the received tasks to the plurality of processing units PU_1 to PU_N, and the plurality of processing units PU_1 to PU_N may perform the distributed tasks (operation S100).

It may be determined whether a specific processing unit among the plurality of processing units PU_1 to PU_N is in the heavy-workload state (e.g., it may be determined whether workloads are concentrated (or focused) on the specific processing unit) (operation S200).

When it is determined that all of the plurality of processing units PU_1 to PU_N are not in the heavy-workload state (operation S200: NO), operation S100 may continue to be performed and the accelerator module 100a will continue to monitor the plurality of processing units PU_1 to PU_N to determine whether any of the processing units are in the heavy-workload state. For example, the plurality of processing units PU_1 to PU_N may continue to perform the distributed tasks. For example, when new tasks are received, the operations of distributing and performing the received tasks may continue to be performed as described above.

When it is determined that the specific processing unit is in the heavy-workload state (operation S200: YES), the managing circuit 140a in the accelerator module 100a may redistribute or reallocate some or all of the tasks distributed in S100 such that the workloads are distributed to the plurality of processing units PU_1 to PU_N in such a manner that none of the processing units PU_1 to PU_N are in the heavy-workload state, and the plurality of processing units PU_1 to PU_N may perform the redistributed tasks (operation S300). Thereafter, operation S100 may continue to be performed.

In some example embodiments, operations S200 and S300 may be performed in real-time or during runtime while the tasks distributed in S100 are being performed. For example, the execution of the tasks may be temporarily suspended, and the above-described load balancing operation may be performed. In some example embodiments, operations S200 and S300 may be performed immediately before the tasks distributed in S100 are performed. For example, the tasks may be performed after the above-described load balancing operation is performed.

Figure 6B:
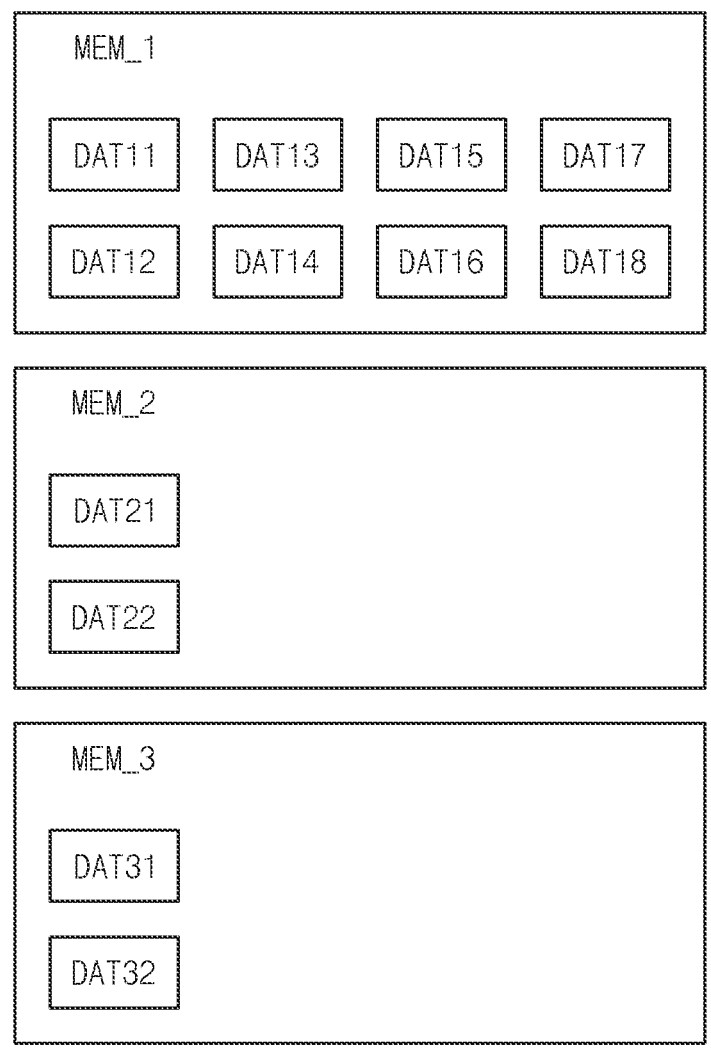

FIGS. 6A and 6B are diagrams for describing an example operation of the illustrative method shown in FIG. 5.

Referring to FIGS. 6A and 6B, an example of operation S100 in FIG. 5 is illustrated, and an example where N=3 in FIG. 4 is illustrated (i.e., three processing units PU_1, PU_2, PU_3 are employed).

As illustrated in FIG. 6A, a plurality of tasks TSK11, TSK12, TSK13, TSK14, TSK15, TSK16, TSK17, TSK18, TSK21, TSK22, TSK31 and TSK32 included in one task group may be received. A task group and tasks included therein may be referred to as a task and sub-tasks, respectively.

As illustrated in FIG. 6B, a plurality of data DAT11, DAT12, DAT13, DAT14, DAT15, DAT16, DAT17, DAT18, DAT21, DAT22, DAT31 and DAT32 associated with the plurality of tasks TSK11, TSK12, TSK13, TSK14, TSK15, TSK16, TSK17, TSK18, TSK21, TSK22, TSK31 and TSK32, respectively, may be stored in memories MEM_1, MEM_2 and MEM_3.

For example, the tasks TSK11 to TSK18 performed using the data DAT11 to DAT18 may be allocated to the first memory sub-channel SCH_1 including the first memory MEM_1 and the first processing unit PU_1 connected thereto. Similarly, the tasks TSK21 and TSK22 performed using the data DAT21 and DAT22 may be allocated to the second memory sub-channel SCH_2 including the second memory MEM_2 and the second processing unit PU_2 connected thereto. The tasks TSK31 and TSK32 performed using the data DAT31 and DAT32 may be allocated to the third memory sub-channel SCH_3 including the third memory MEM_3 and the third processing unit PU_3 connected thereto.

Figure 7:
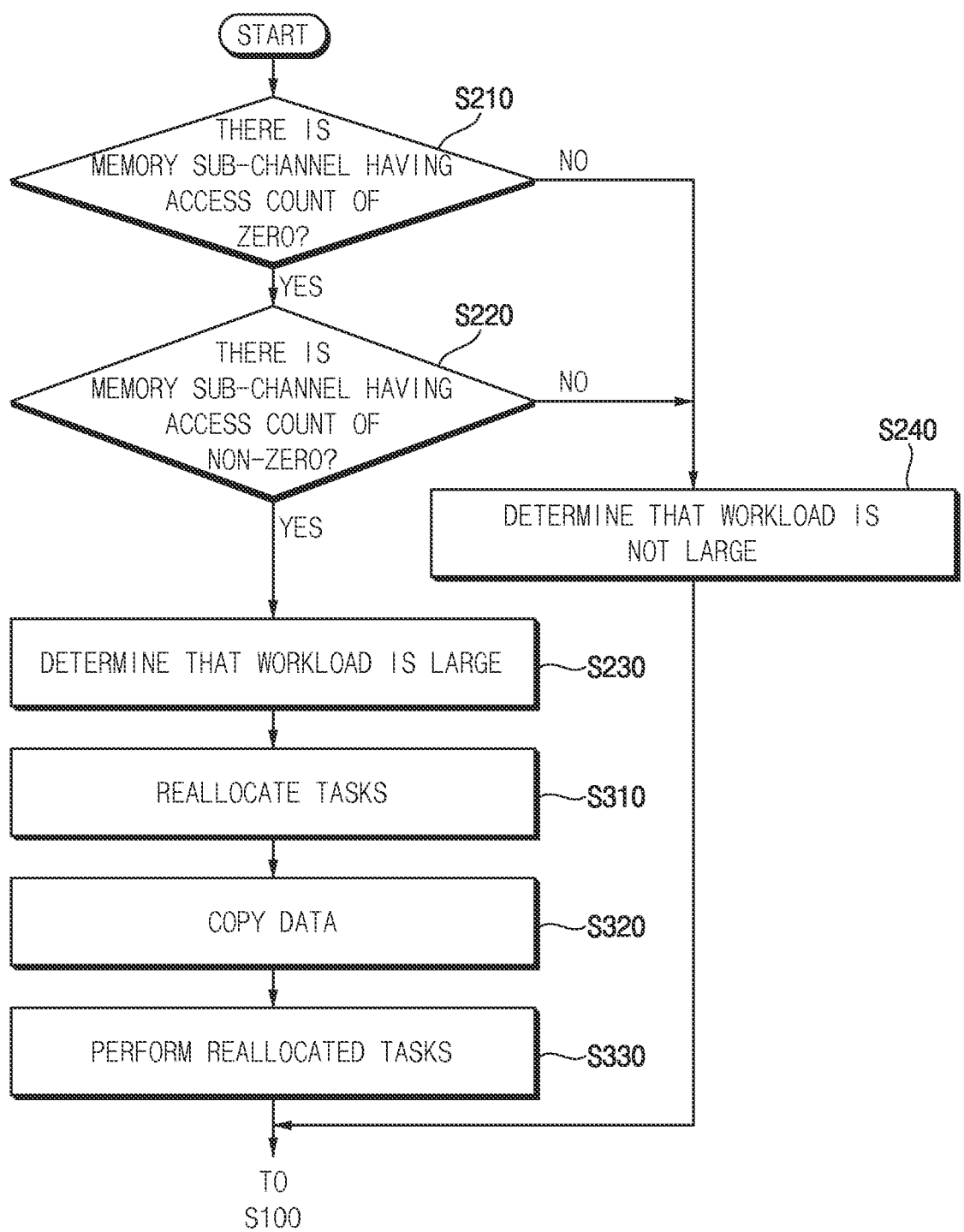
FIG. 7 is a flowchart illustrating an example of operations S200 and S300 of the example method shown in FIG. 5.

FIG. 7 is a flowchart illustrating an example of operations S200 and S300 performed by the illustrative method shown in FIG. 5, according to one or more embodiments.

Referring to FIGS. 4, 5 and 7, in operation S200, the heavy-workload state of the plurality of processing units PU_1 to PU_N may be determined by checking the access counts of the plurality of memory sub-channels SCH_1 to SCH_N connected to the plurality of processing units PU_1 to PU_N. For example, the access count may represent the remaining number of access operations for a specific memory at a current point in time. For example, the access operation may be a read operation for a specific memory, and the access count may be a read access count.

For example, among the plurality of memory sub-channels SCH_1 to SCH_N, when a memory sub-channel having an access count of zero exists (operation S210: YES) and when a memory sub-channel having an access count of non-zero exists (operation S220: YES), it may be determined that the memory sub-channel having the access count of non-zero and the processing unit connected thereto are in the heavy-workload state (e.g., it may be determined that a workload of the processing unit connected to the memory sub-channel having the access count of non-zero is larger than the reference workload) (operation S230). In this example, in operation S300, some or all of the tasks allocated to the processing unit in the heavy-workload state may be reallocated to another processing unit that is not in the heavy-workload state (operation S310), data associated with the reallocated task may be copied to another memory sub-channel (operation S320), and the reallocated task may be performed by the other (e.g., re-assigned) processing unit (operation S330). The process may then return to operation S100.

In contrast, when a memory sub-channel having an access count of zero does not exist (operation S210: NO) or when a memory sub-channel having an access count of non-zero does not exist (operation S220: NO), e.g., when all access counts are non-zero or when all access counts are zero at the same time, it may be determined that all processing units are not in the heavy-workload state (e.g., it may be determined that the workloads of all processing units are not larger than the reference workload) (operation S240). In this example, the process may be terminated (i.e., return to operation S100) without performing operations S310, S320 and S330; that is, operations S310, S320 and S330 may be bypassed.

Figure 8A:
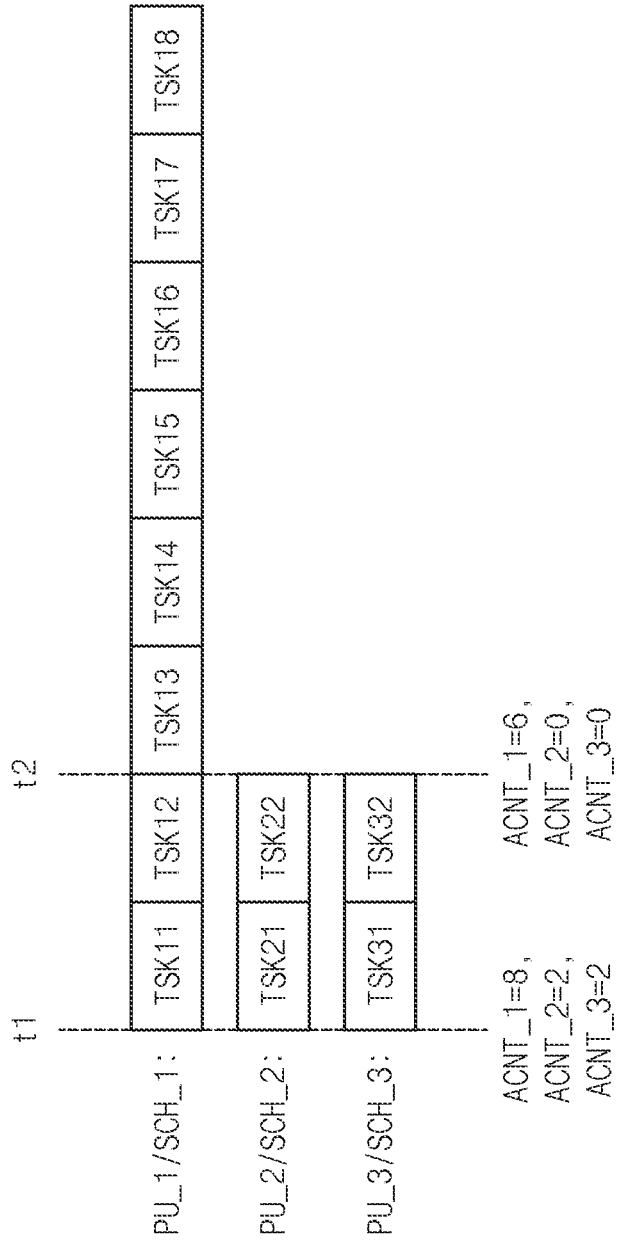
Figure 8C:
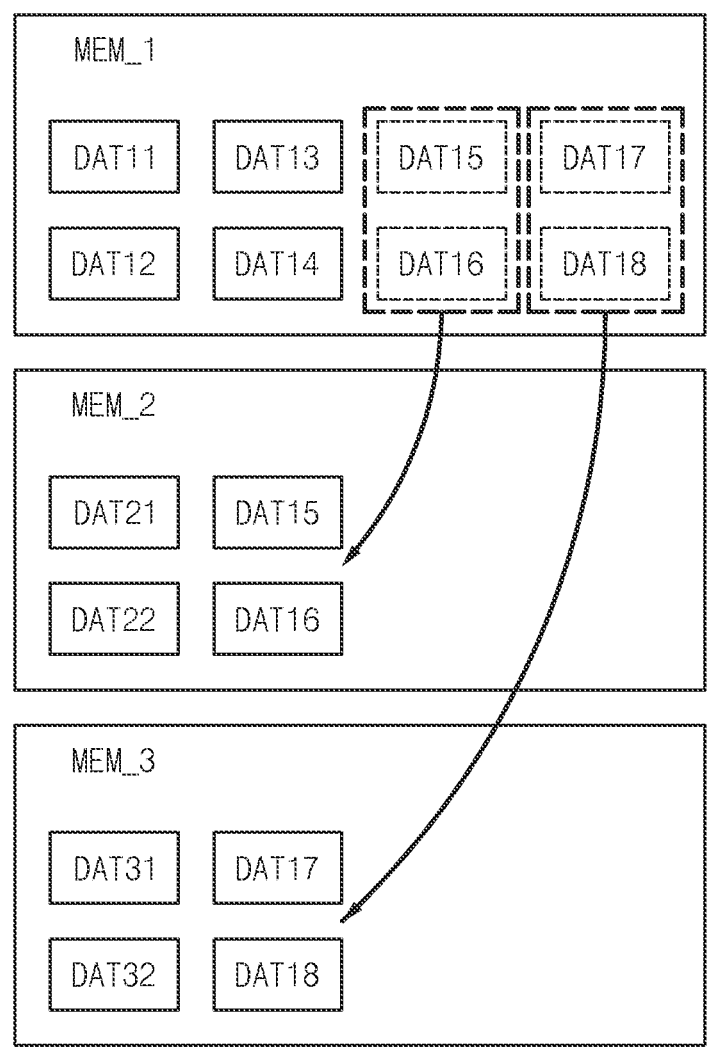

By way of illustration only and without limitation, FIGS. 8A, 8B and 8C are diagrams for conceptually describing an operation of the illustrative process shown in FIG. 7, according to one or more embodiments.

Referring to FIGS. 8A, 8B and 8C, an example where the operation of FIG. 7 is performed on the example of FIGS. 6A and 6B is illustrated.

As illustrated in FIG. 8A, at time point t1 after the plurality of tasks TSK11 to TSK18, TSK21, TSK22, TSK31 and TSK32 are distributed and they are not performed yet, it is assumed that, for purposes of illustration only, an access count ACNT_1 of the first memory sub-channel SCH_1 may be eight, an access count ACNT_2 of the second memory sub-channel SCH_2 may be two, and an access count ACNT_3 of the third memory sub-channel SCH_3 may be two. Thereafter, at time point t2 after some tasks TSK11, TSK12, TSK21, TSK22, TSK31 and TSK32 are performed, the access count ACNT_1 of the first memory sub-channel SCH_1 may be six, the access count ACNT_2 of the second memory sub-channel SCH_2 may be zero, and the access count ACNT_3 of the third memory sub-channel SCH_3 may be zero. After time point t2, only the first processing unit PU_1 and the first memory sub-channel SCH_1 may perform tasks, and the remaining processing units PU_2 and PU_3 and the remaining memory sub-channels SCH_2 and SCH_3 may not perform tasks. Therefore, it may be determined that the first processing unit PU_1 and the first memory sub-channel SCH_1 are in the heavy-workload state or the workloads are concentrated on the first processing unit PU_1 and the first memory sub-channel SCH_1, and not focused on the other two processing units PU_2 and PU_3.

Accordingly, as illustrated in FIG. 8B, the execution of the tasks may be suspended at time point t2, and the load balancing operation may be performed from time point t2 to time point t3 such that some tasks TSK15 to TSK18 among the tasks TSK13 to TSK18 that are allocated to the first processing unit PU_1 and not performed yet may be reallocated. For example, the tasks TSK15 and TSK16 may be reallocated to the second processing unit PU_2, and the tasks TSK17 and TSK18 may be reallocated to the third processing unit PU_3, such that tasks TSK13 and TSK14 are performed by the first processing unit PU_1 in parallel with tasks TSK15 and TSK16 performed by the second processing unit PU_2, and tasks TSK17 and TSK18 performed by the third processing unit PU_3.

In addition, as illustrated in FIG. 8C, the data DAT15 to DAT18 associated with the reallocated tasks TSK15 to TSK18 may be copied from the first memory MEM_1 to other memories MEM_2 and MEM_3. For example, the data DAT15 and DAT16 associated with the tasks TSK15 and TSK16 reallocated to the second processing unit PU_2 may be copied to the second memory MEM_2 included in the second memory sub-channel SCH_2 connected to the second processing unit PU_2, and the data DAT17 and DAT18 associated with the tasks TSK17 and TSK18 reallocated to the third processing unit PU_3 may be copied to the third memory MEM_3 included in the third memory sub-channel SCH_3 connected to the third processing unit PU_3. For example, the copied data may be deleted from the first memory MEM_1.

In some example embodiments, the above-described data copy operation may be performed by the managing circuit 140a by itself. For example, the managing circuit 140a may include a direct memory access (DMA) engine (e.g., DMA_ENG in FIG. 11), and a memory copy command may be internally generated and executed using the DMA engine. In some example embodiments, the above-described data copy operation may be performed under the control of an external host device. For example, the managing circuit 140a may request the data copy operation to the host device, the host device may provide a memory copy request including a source address, a destination address, etc., to the managing circuit 140a, and a memory copy command may be generated and executed based on the memory copy request. For example, the host device may check by polling in the AXDIMM, and information may be reported by CXL.io protocol in the CXL-NMP.

Thereafter, at time point t3, the reallocated tasks may be performed again. As compared to FIG. 8A, it can be seen that time required to complete all tasks TSK11 to TSK18, TSK21, TSK22, TSK31 and TSK32) is reduced in FIG. 8B.

Figure 9:
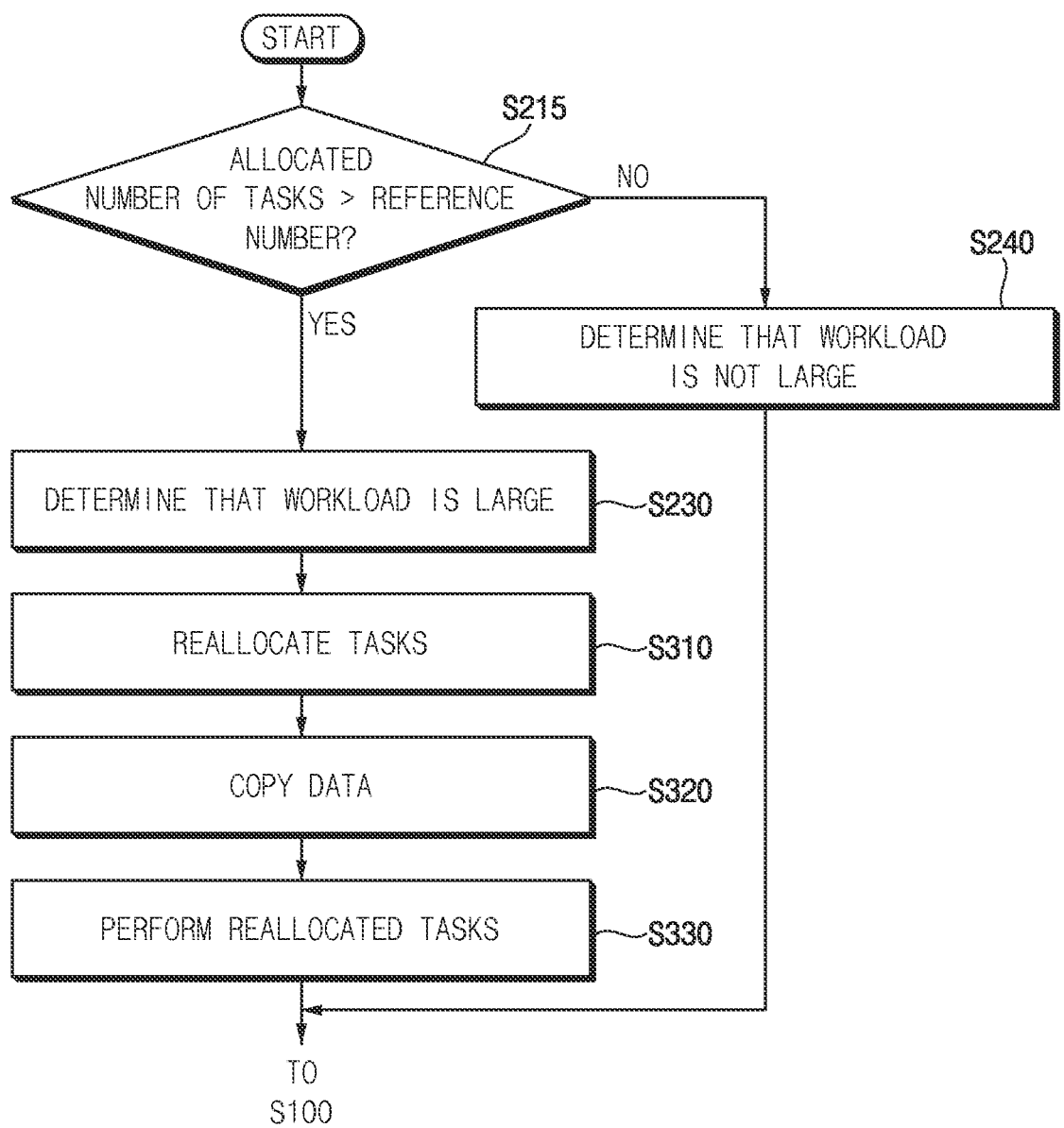
FIG. 9 is a flowchart illustrating an example of operations S200 and S300 of the example method shown in FIG. 5.

FIG. 9 is a flowchart illustrating an example of operations S200 and S300 performed by the illustrative method shown in FIG. 5, according to one or more embodiments. The descriptions repeated with FIG. 7 will be omitted.

Referring to FIGS. 4, 5 and 9, in operation S200, the heavy-workload state of the plurality of processing units PU_1 to PU_N may be determined by checking the number of tasks allocated to the plurality of processing units PU_1 to PU_N.

For example, among the plurality of processing units PU_1 to PU_N, when a processing unit in which the number of allocated tasks is greater than a reference number exists (operation S215: YES), it may be determined that the processing unit having allocated tasks greater than the reference number is in the heavy-workload state (e.g., it may be determined that a workload of the processing unit having allocated tasks greater than the reference number is larger than the reference workload) (operation S230). Subsequent operations S310, S320 and S330 may be substantially the same as those described with reference to FIG. 7.

When a processing unit in which the number of allocated tasks is greater than a reference number does not exist (operation S215: NO), it may be determined that all processing units are not in the heavy-workload state (e.g., it may be determined that the workloads of all processing units are not larger than the reference workload) (operation S240).

By way of example only and without limitation, FIGS. 10A and 10B are diagrams for describing an illustrative operation of FIG. 9. The descriptions repeated with FIGS. 8A, 8B and 8C will be omitted.

Referring to FIGS. 10A and 10B, an example where the operations S200 and S300 of FIG. 9 are performed on the example of FIGS. 6A and 6B is illustrated.

As illustrated in FIG. 10A, at time point t1, a task count TCNT_1 of tasks allocated to the first processing unit PU_1 may be eight, a task count TCNT_2 of tasks allocated to the second processing unit PU_2 may be two, and a task count TCNT_3 of tasks allocated to the third processing unit PU_3 may be two. For example, if the reference number used as a threshold for determining whether a processing unit is in a heavy-workload state is six, which is half of the total number of tasks performed across the three processing units, the task count TCNT_1 may be greater than six, and thus it may be determined that the first processing unit PU_1 and the first memory sub-channel SCH_1 are in the heavy-workload state or the workloads are more heavily concentrated on the first processing unit PU_1 and the first memory sub-channel SCH_1.

Accordingly, as illustrated in FIG. 10B, the load balancing operation may be performed from time point t1 to time point t4 before the execution of the tasks starts such that some tasks TSK15 to TSK18 among the tasks TSK11 to TSK18 that are allocated to the first processing unit PU_1 and not performed yet may be reallocated. The reallocation operation and the data copy operation may be substantially the same as those described with reference to FIGS. 8B and 8C. Thereafter, at time point t4, the reallocated tasks may be performed.

Figure 11:
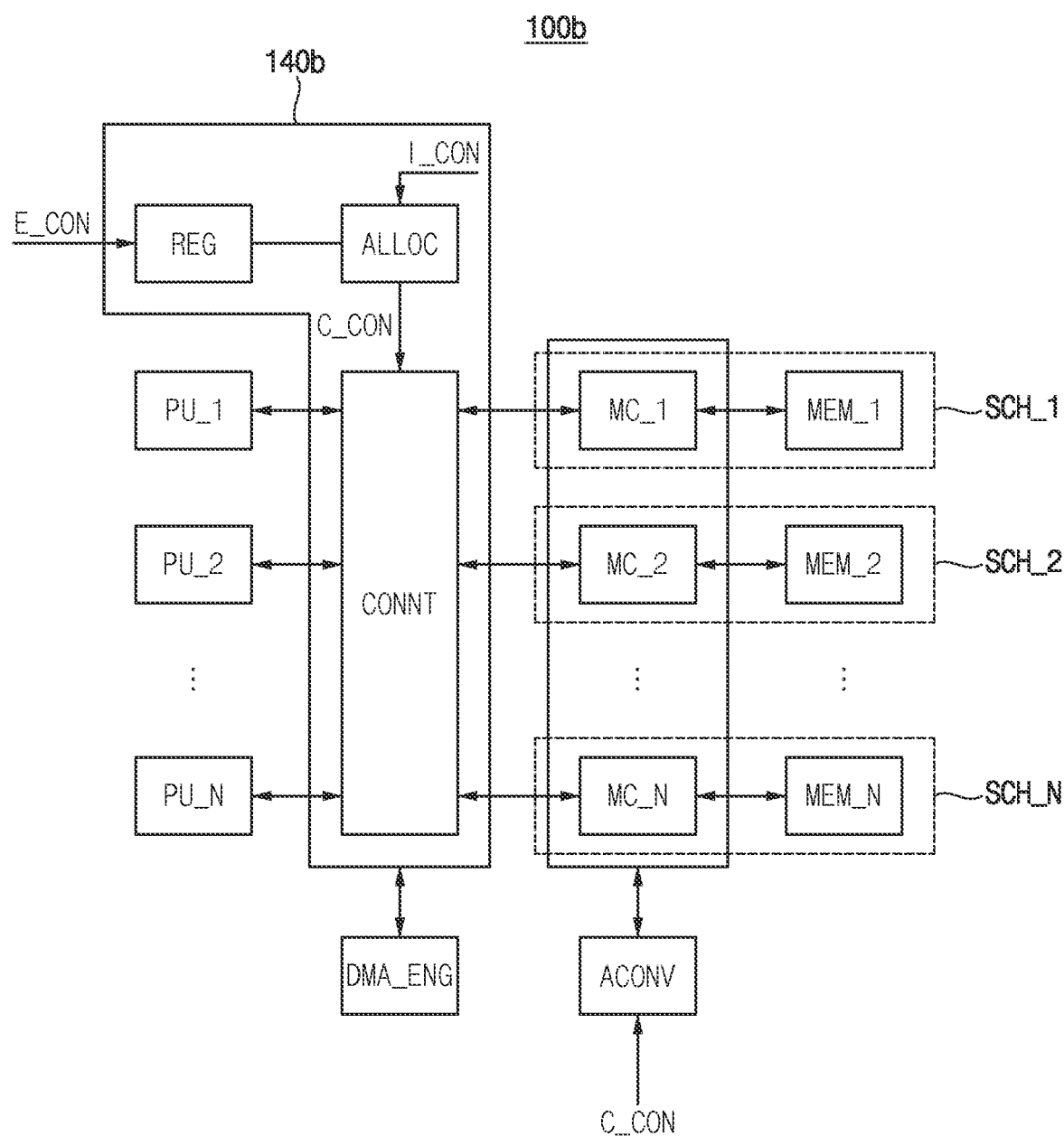
FIG. 11 is a block diagram illustrating at least a portion of an example accelerator module, according to one or more embodiments.

FIG. 11 is a block diagram illustrating at least a portion of an example accelerator module 100b, according to one or more embodiments. The descriptions repeated with FIG. 4 will be omitted.

Referring to FIG. 11, the accelerator module 100b may include a plurality of memories MEM_1, MEM_2, . . . , MEM_N, a plurality of memory controllers MC_1, MC_2, . . . , MC_N, a plurality of processing units PU_1, PU_2, . . . , PU_N, and a managing circuit 140b. The accelerator module 100b may further include a direct memory access (DMA) engine DMA_ENG and an address converter ACONV.

The managing circuit 140b may include an allocator ALLOC and a connector CONNT, and may further include a register REG. The managing circuit 140b may perform the channel connection changing operation among the workload management operation described with reference to FIG. 1.

The allocator ALLOC may generate a connection control signal C_CON for controlling the connections between the plurality of memory controllers MC_1 to MC_N and the plurality of corresponding processing units PU_1 to PU_N.

The connector CONNT may be disposed or located between the plurality of memory controllers MC_1 to MC_N and the plurality of processing units PU_1 to PU_N, and may connect each of the plurality of processing units PU_1 to PU_N with at least one of the plurality of memory controllers MC_1 to MC_N based on the connection control signal C_CON. The connector CONNT may be referred to as an interconnect logic.

In some example embodiments, the above-described operation of the allocator ALLOC and the connector CONNT, e.g., the channel connection changing operation may be performed based on an external control signal E_CON. For example, the external control signal E_CON may be provided from an external host device, the setting of the register REG may be changed based on the external control signal E_CON, and the connection control signal C_CON may be generated based on the setting change of the register REG. In some example embodiments, the above-described operation of the allocator ALLOC and the connector CONNT may be performed based on an internal control signal I_CON supplied to the allocator ALLOC. For example, the internal control signal I_CON may be internally generated by the managing circuit 140b by itself, and the managing circuit 140b may further include components (e.g., the plurality of load checkers LCHK_1 to LCHK_N in FIG. 4) for generating the internal control signal I_CON.

The DMA engine DMA_ENG may perform a data copy operation after the above-described channel connection changing (i.e., channel reassignment or channel reallocation) operation is performed. The address converter ACONV may change address mapping information after the above-described channel connection changing operation and data copy operation are performed, based at least in part on the connection control signal C_CON generated by the allocator ALLOC.

Figure 12:
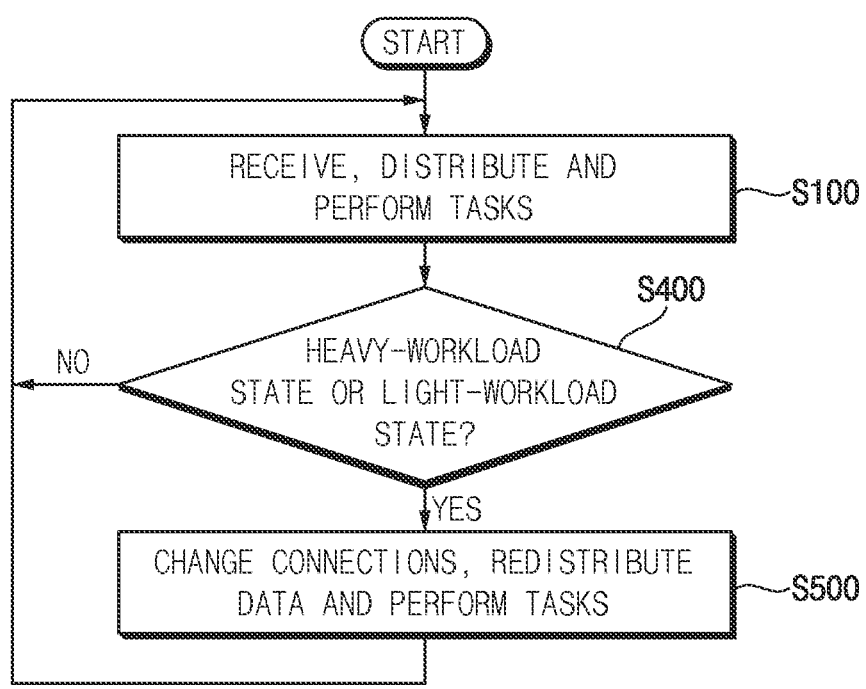
FIG. 12 is a flowchart illustrating an example method of operating the example accelerator module shown in FIG. 11, according to one or more embodiments.

FIG. 12 is a flowchart illustrating at least a portion of an example method of operating the illustrative accelerator module 100b shown in FIG. 11, according to one or more embodiments. The descriptions repeated with FIG. 5 will be omitted.

Referring to FIGS. 11 and 12, in a method of operating the accelerator module 100b, operation S100 may be substantially the same as described with reference to FIG. 5.

It may be determined whether a specific processing unit among the plurality of processing units PU_1 to PU_N is in the heavy-workload state or a light-workload state (e.g., it may be determined whether workloads are concentrated or not on the specific processing unit being monitored) (operation S400).

When it is determined that all of the plurality of processing units PU_1 to PU_N are not in the heavy-workload state or the light-workload state (operation S400: NO), operation S100 may continue to be performed.

When it is determined that the specific processing unit is in the heavy-workload state or the light-workload state (operation S400: YES), the managing circuit 140b may change the connections between the plurality of processing units PU_1 to PU_N and the plurality of memory controllers MC_1 to MC_N, data may be redistributed or reallocated to correspond to the connection changes, and the plurality of processing units PU_1 to PU_N may perform the redistributed tasks (operation S500).

Figure 13A:
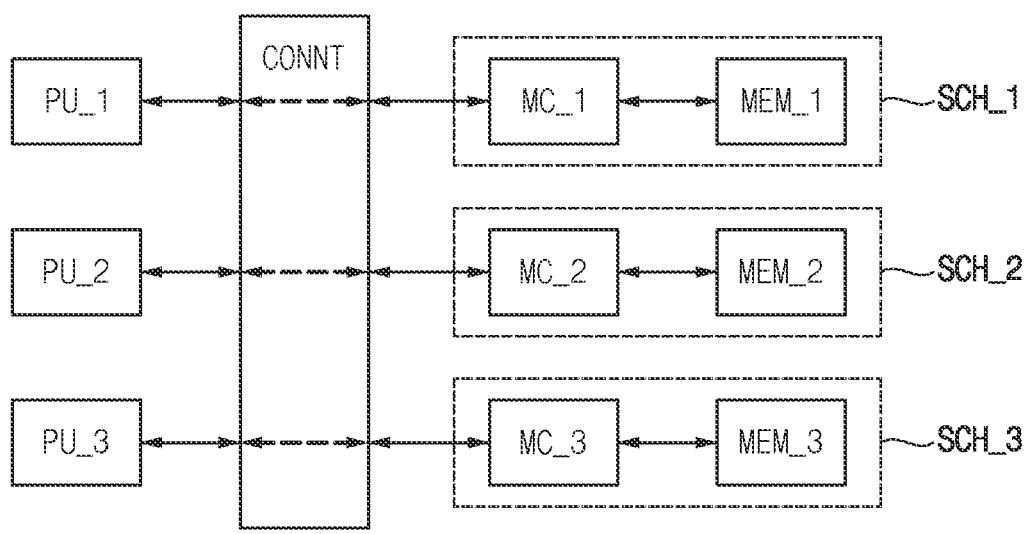
Figure 13B:
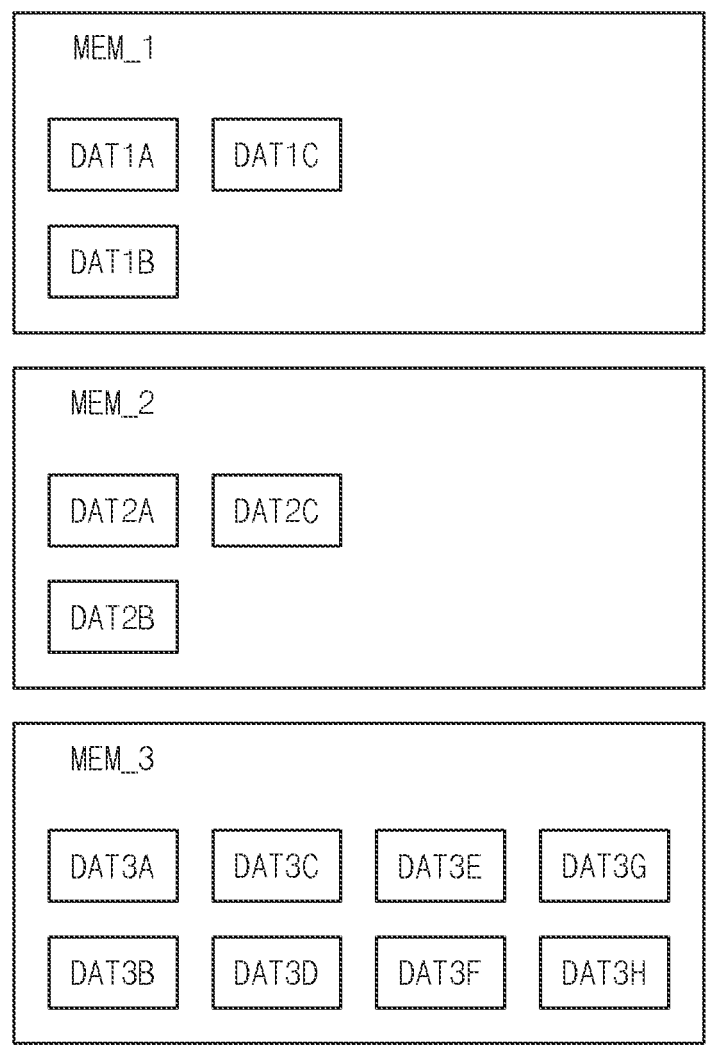

FIGS. 13A, 13B and 13C are block diagrams for describing an operation of FIG. 12.

Referring to FIGS. 13A, 13B and 13C, a connection state at an initial operation time is illustrated, an example of operation S100 in FIG. 12 is illustrated, and an example where N=3 in FIG. 11 is illustrated.

As illustrated in FIG. 13A, at the initial operation time, the first processing unit PU_1 may be connected to the first memory controller MC_1 through the connector CONNT, the second processing unit PU_2 may be connected to the second memory controller MC_2 through the connector CONNT, and the third processing unit PU_3 may be connected to the third memory controller MC_3 through the connector CONNT. In one or more embodiments, these connections through the connector CONNT may be reconfigurable based on monitored workload conditions in the accelerator module.

As illustrated in FIG. 13B, a plurality of data DAT1A, DAT1B, DAT1C, DAT2A, DAT2B, DAT2C, DAT3A, DAT3B, DAT3C, DAT3D, DAT3E, DAT3F, DAT3G and DAT3H may be stored in memories MEM_1, MEM_2 and MEM_3.

For example, tasks performed using the data DAT1A to DAT1C may be allocated to the first memory sub-channel SCH_1 including the first memory MEM_1 and the first processing unit PU_1 connected thereto. Similarly, tasks performed using the data DAT2A to DAT2C may be allocated to the second memory sub-channel SCH_2 including the second memory MEM_2 and the second processing unit PU_2 connected thereto. Tasks performed using the data DAT3A to DAT3H may be allocated to the third memory sub-channel SCH_3 including the third memory MEM_3 and the third processing unit PU_3 connected thereto.

As illustrated in FIG. 13C, the address converter ACONV (FIG. 11) may include address mapping information including a relationship between host addresses HPA_1A, HPA_1B, HPA_1C, HPA_2A, HPA_2B, HPA_2C, HPA_3A, HPA_3B, HPA_3C, HPA_3D, HPA_3E, HPA 3F and HPA 3G, HPA_3H and device addresses DPA_M1_1A, DPA_M1_1B, DPA_M1_1C, DPA_M2_2A, DPA_M2_2B, DPA_M2_2C, DPA_M3_3A, DPA_M3_3B, DPA_M3_3C, DPA_M3_3D, DPA_M3_3E, DPA_M3_3F, DPA_M3_3G and DPA_M3_3H of the data DAT1A to DAT1C, DAT2A to DAT2C and DAT3A to DAT3H. Each data may correspond to one host address and one device address. For example, the host address may be a host physical address (HPA) received from the host device, and the device address may be a device physical address (DPA) in which data is actually stored inside the accelerator module.

Figure 14A:
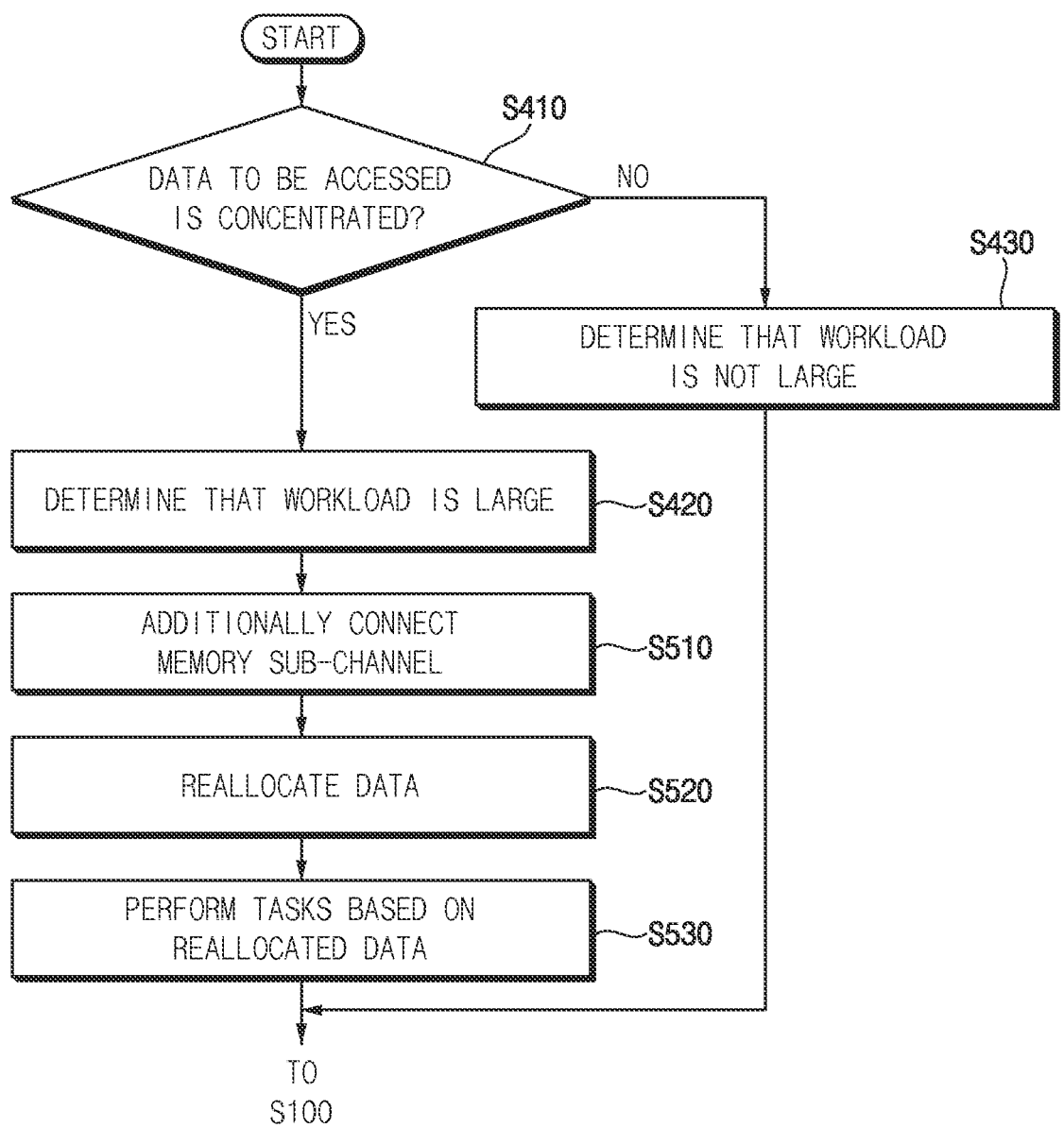
FIGS. 14A and 14B are flowcharts illustrating examples of operations S400 and S500 in the example method shown in FIG. 12, according to one or more embodiments.
Figure 14B:
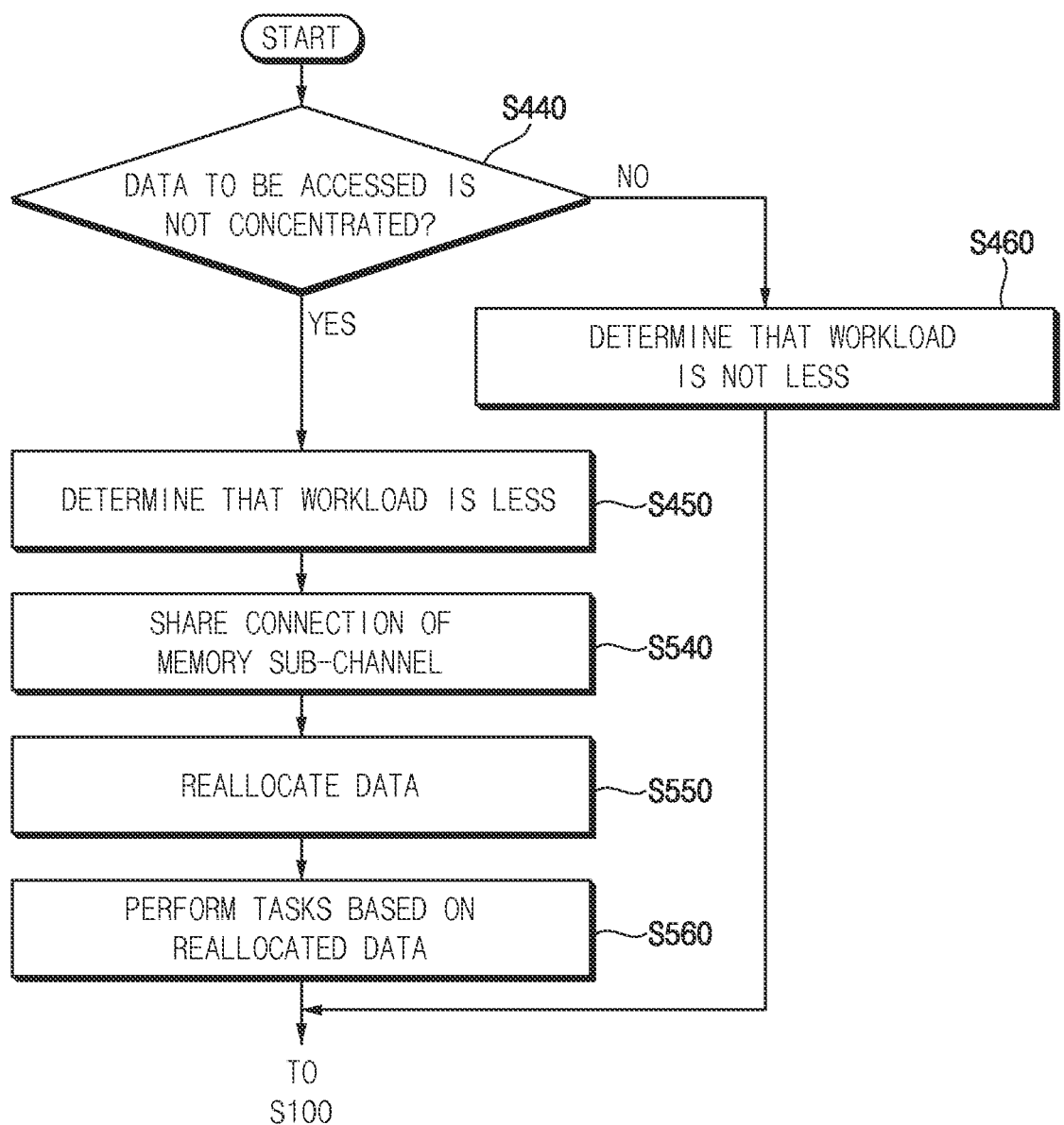

FIGS. 14A and 14B are flowcharts illustrating examples of operations S400 and S500 performed in FIG. 12, according to one or more embodiments.

Referring to FIGS. 11, 12, 14A and 14B, in operation S400, the heavy-workload state or the light-workload state of the plurality of processing units PU_1 to PU_N may be determined by checking a location of data to be accessed (e.g., read) by a specific processing unit.

In some example embodiments, as illustrated in FIG. 14A, when data to be accessed by the specific processing unit is concentrated or focused in a specific memory sub-channel and a specific memory (operation S410: YES), it may be determined that the workload of the specific processing unit is larger than a first reference workload (operation S420). For example, as with that described with reference to FIGS. 7 and 9, the above-described determination operation may be performed based on a specific count and/or a specific reference number. In this example, in operation S500, a memory sub-channel may be additionally connected to the specific processing unit (operation S510), associated data may be reallocated (operation S520), and tasks may be performed based on the reallocated data (operation S530).

When the data to be accessed by the specific processing unit is not concentrated in the specific memory sub-channel and the specific memory (operation S410: NO), it may be determined that the workload of the specific processing unit is not larger than the first reference workload (operation S430). In this example, the process may be terminated without performing operations S510, S520 and S530; that is, operations S510, S520 and S530 may be bypassed and the process returns to operation S100.

In some example embodiments, as illustrated in FIG. 14B, when data to be accessed by the specific processing unit is unconcentrated or unfocused in a specific memory sub-channel and a specific memory (operation S440: YES), it may be determined that the workload of the specific processing unit is less than a second reference workload (operation S450). In this example, in operation S500, the connection of the memory sub-channel of the specific processing unit may be shared with another processing unit (operation S540), associated data may be reallocated (operation S550), and tasks may be performed based on the reallocated data (operation S560).

When the data to be accessed by the specific processing unit is not unconcentrated in the specific memory sub-channel and the specific memory (operation S440: NO), it may be determined that the workload of the specific processing unit is not less than the second reference workload (operation S460). In this example, the process may be terminated without performing operations S540, S550 and S560; that is, operations S540, S550 and S560 may be bypassed and the process returns to operation S100.

Figure 15A:
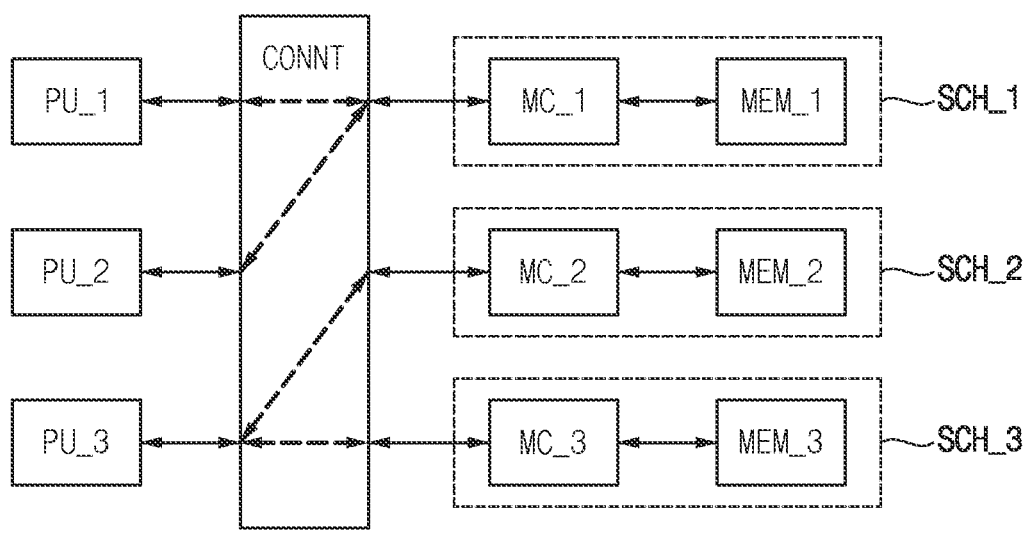
Figure 15B:
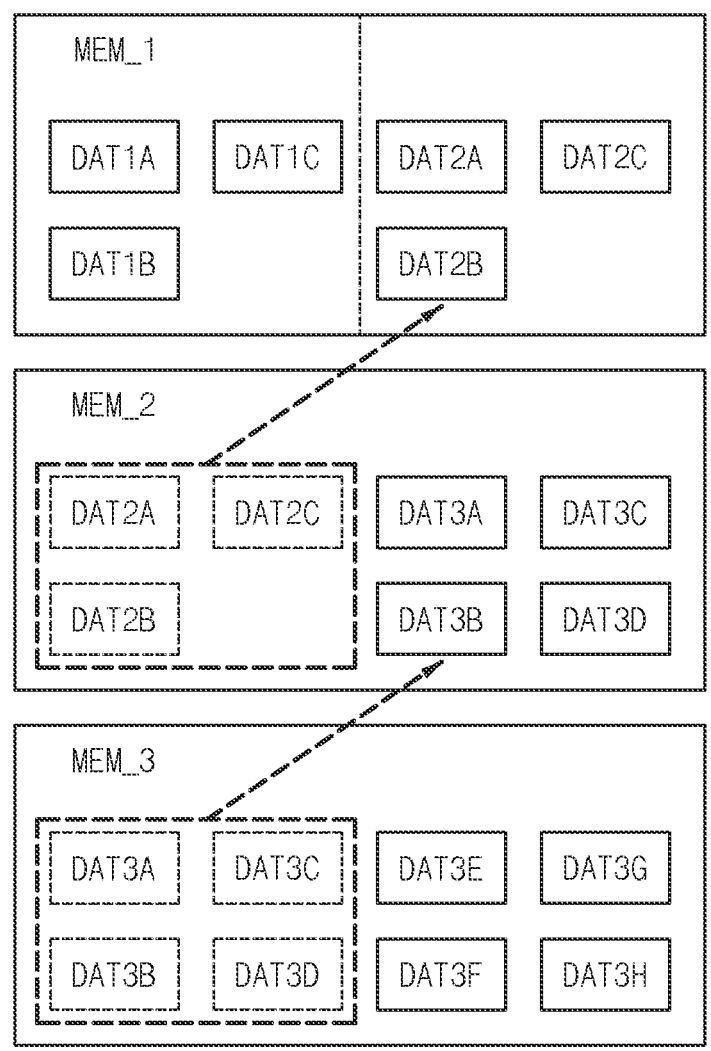

FIGS. 15A, 15B and 15C are diagrams for describing operations of FIGS. 14A and 14B.

Referring to FIGS. 15A, 15B and 15C, an example where the operations of FIGS. 14A and 14B are performed on the example of FIGS. 13A, 13B and 13C is illustrated.

As illustrated in FIG. 13B, the data DAT3A to DAT3H to be accessed by the third processing unit PU_3 may be concentrated (e.g., the data DAT3A to DAT3H may be relatively dense). Thus, it may be determined that a workload of the third processing unit PU_3 is larger than the first reference workload (the reference workload being a pre-scribed threshold for determining whether a processing unit is in a heavy-workload state). As illustrated in FIG. 15A, the second memory sub-channel SCH_2 may be additionally connected to the third processing unit PU_3 using the allocator ALLOC and the connector CONNT. In other words, the operation of FIG. 14A may be performed on the third processing unit PU_3.

In addition, as illustrated in FIG. 13B, the data DAT1A to DAT1C to be accessed by the first processing unit PU_1 and the data DAT2A to DAT2C to be accessed by the second processing unit PU_2 may be unconcentrated (e.g., the data DAT1A to DAT1C and DAT2A to DAT2C may be relatively sparse). Thus, it may be determined that workloads of the first and second processing units PU_1 and PU_2 are less than the second reference workload. As illustrated in FIG. 15A, the second processing unit PU_2 may be disconnected from the second memory sub-channel SCH_2 and may be connected to and the first memory sub-channel SCH_1 using the allocator ALLOC and the connector CONNT, and the first memory sub-channel SCH_1 may be shared by the first and second processing units PU_1 and PU_2. In other words, the operation of FIG. 14B may be performed on the first and second processing units PU_1 and PU_2.

When the connection state is changed as illustrated in FIG. 15A, the data DAT2A to DAT2C and the data DAT3A to DAT3D may be copied by the DMA engine DMA_ENG as illustrated in FIG. 15B. For example, when the second processing unit PU_2 is connected to the first memory sub-channel SCH_1, the data DAT2A to DAT2C associated with the tasks performed by the second processing unit PU_2 may be copied to the first memory MEM_1. For example, the first memory MEM_1 may be divided into two regions such that a space for storing the data DAT1A to DAT1C and a space for storing the data DAT2A to DAT2C are distinguished or separated from each other in the first memory MEM_1. For example, when the third processing unit PU_3 is additionally connected to the second memory sub-channel SCH_2, some data DAT3A to DAT3D among the data DAT3A to DAT3H associated with the tasks performed by the third processing unit PU_3 may be copied to the second memory MEM_2. For example, the copied data may be deleted from the second and third memories MEM_2 and MEM_3.

In addition, when the data is copied as illustrated in FIG. 15B, the address mapping information may be changed or updated by the address converter ACONV as illustrated in FIG. 15C. For example, device addresses DPA_M1_2A, DPA_M1_2B and DPA_M1_2C of the data DAT2A to DAT2C, and device addresses DPA_M2_3A, DPA_M2_3B, DPA_M2.3C and DPA_M2_3D of the data DAT3A to DAT3D may be changed. Thus, when the data DAT2A to DAT2C are to be accessed by an external host device, the first memory MEM_1 after copying may be accessed based on the updated address mapping information, rather than the second memory MEM_2 before copying. Similarly, when the data DAT3A to DAT3D are to be accessed by an external host device, the second memory MEM_2 after copying may be accessed based on the updated address mapping information, rather than the third memory MEM_3 before copying.

In some example embodiments, the above-described operations of FIGS. 15A, 15B and 15C may be performed under the control of an external host device. For example, the operations may be performed by the CXL.io protocol in the CXL-NMP. In some example embodiments, the above-described operations of FIGS. 15A, 15B and 15C may be performed by the managing circuit 140b by itself.

Figure 16:
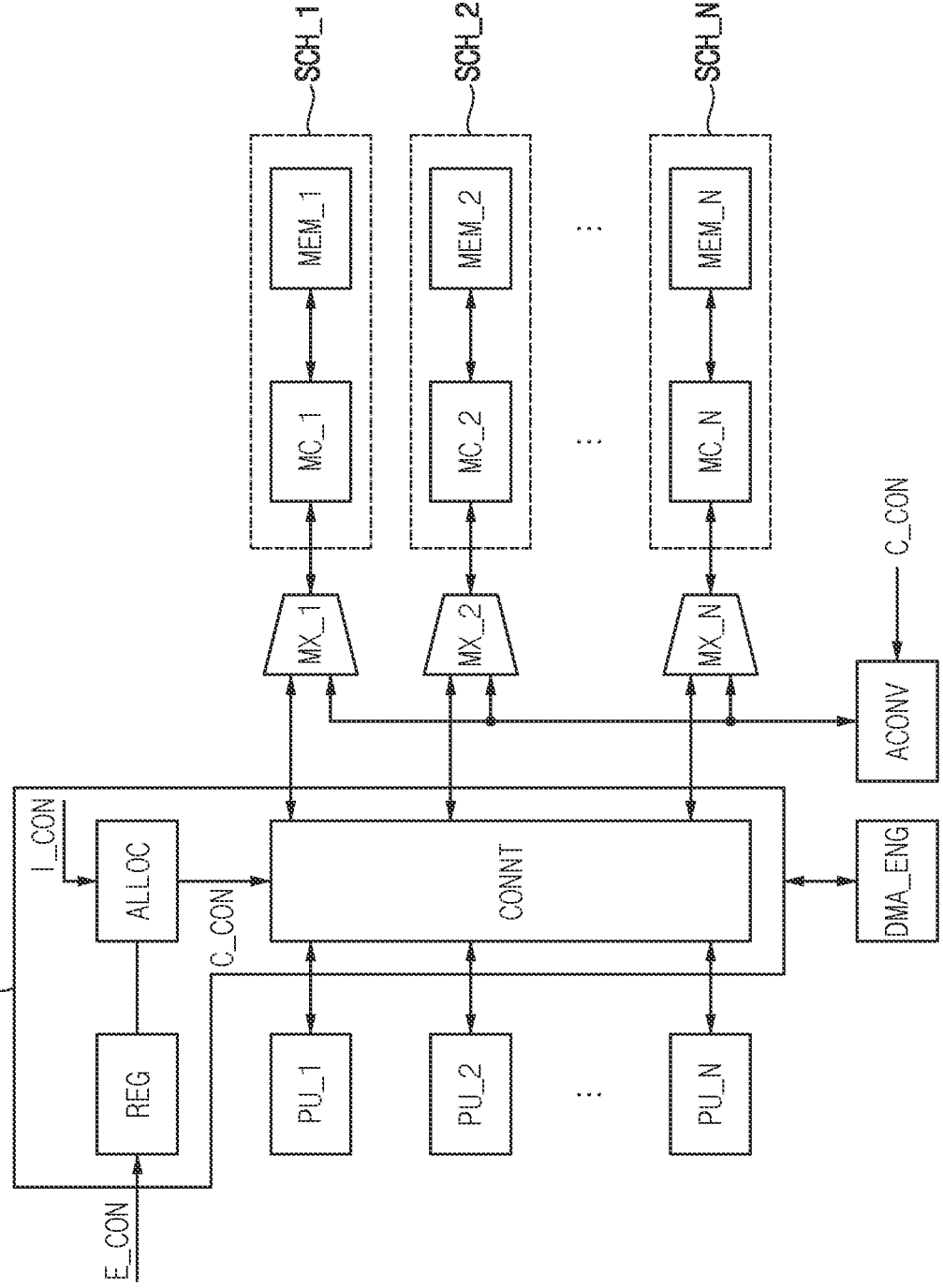
FIG. 16 is a block diagram illustrating at least a portion of an example accelerator module, according to one or more embodiments.

FIG. 16 is a block diagram illustrating at least a portion of an example accelerator module 100c, according to one or more embodiments. The descriptions repeated with FIG. 11 will be omitted.

Referring to FIG. 16, the accelerator module 100c may include a plurality of memories MEM_1, MEM_2, . . . , MEM_N, a plurality of memory controllers MC_1, MC_2, . . . , MC_N, a plurality of processing units PU_1, PU_2, . . . , PU_N, and a managing circuit 140b. The accelerator module 100c may further include a DMA engine DMA_ENG, an address converter ACONV and a plurality of multiplexers MX_1, MX_2, . . . , MX_N.

The accelerator module 100c may be substantially the same as the accelerator module 100b of FIG. 11, except that the accelerator module 100c further includes the plurality of multiplexers MX_1 to MX_N.

The plurality of multiplexers MX_1 to MX_N may connect one of the plurality of processing units PU_1 to PU_N and the address converter ACONV with the plurality of memory controllers MC_1 to MC_N.

For example, the plurality of multiplexers MX_1 to MX_N may include first to N-th multiplexers MX_1 to MX_N. For example, the first multiplexer MX_1 may connect at least one of the plurality of processing units PU_1 to PU_N, which is to be connected to the first memory controller MC_1 through the connector CONNT, with the first memory controller MC_1, or may connect the address converter ACONV with the first memory controller MC_1. When the host device requires to communicate with the first memory controller MC_1 and the first memory sub-channel SCH_1, the connection between the first memory sub-channel SCH_1 and at least one of the plurality of processing units PU_1 to PU_N may be blocked by the first multiplexer MX_1. Although not illustrated in detail, the plurality of multiplexers MX_1 to MX_N may operate based on the selection signal.

Although not illustrated in detail, example embodiments may be implemented by combining the accelerator module described with reference to FIGS. 4 through 10 and the accelerator module described with reference to FIGS. 11 through 16.

FIGS. 17, 18, 19 and 20 are block diagrams illustrating at least a portion of example computing systems including an accelerator module according to illustrative embodiments.

Figure 17:
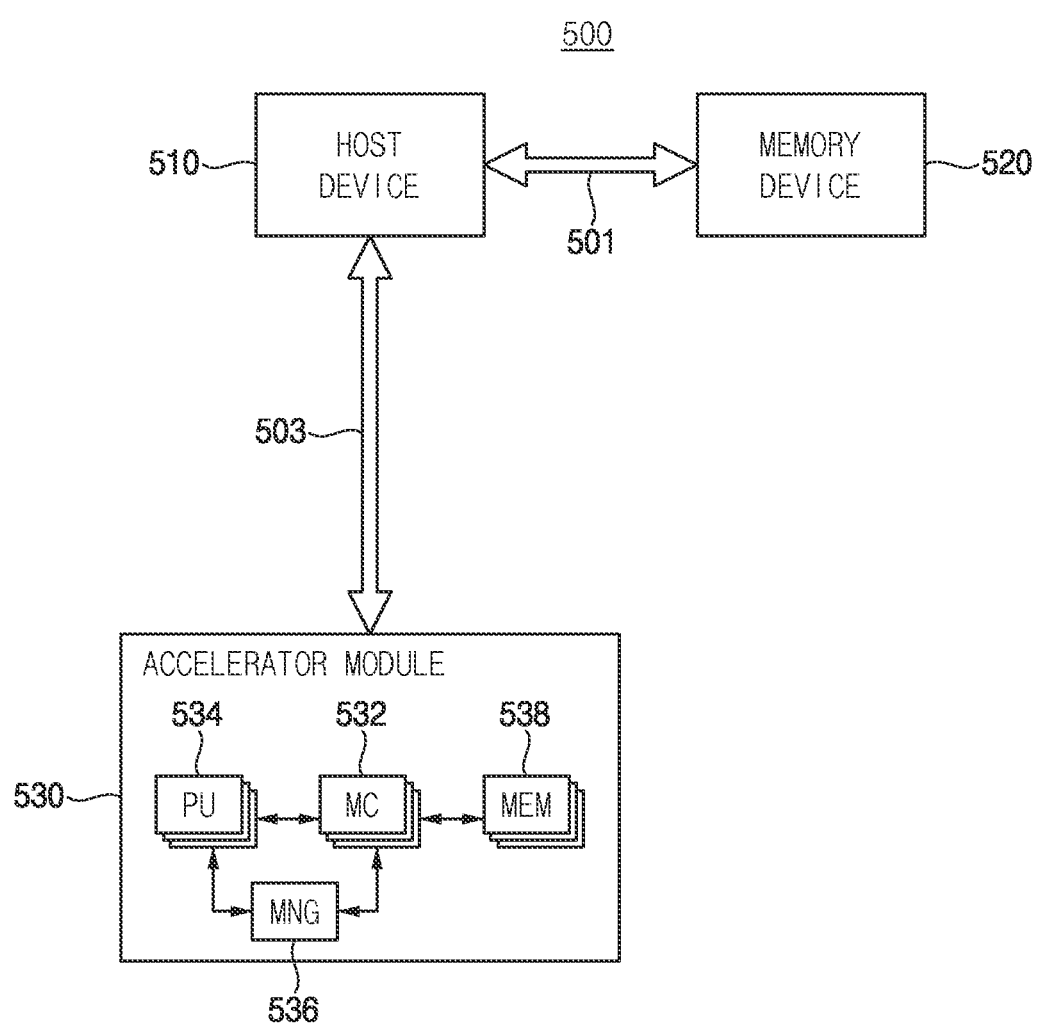
FIGS. 17, 18, 19 and 20 are block diagrams illustrating at least a portion of an example computing system including an accelerator module according to one or more embodiments.

Referring to FIG. 17, a computing system 500 includes a host device 510, a memory device 520 and an accelerator module 530. The computing system 500 may further include a first bus 501 and a second bus 503.

The host device 510 may control overall operations of the computing system 500. For example, the host device 510 may include at least one of various processing units, e.g., a central processing unit (CPU), etc.

The memory device 520 may be connected to the host device 510 through the first bus 501, and communicates with the host device 510 through the first bus 501 and a first interface (not explicitly shown, but implied). The memory device 520 may be used, for example, as a buffer memory, cache memory, and/or system memory for the host device 510.

The accelerator module 530 may be connected to the host device 510 through the second bus 503, and communicates with the host device 510 through the second bus 503 and a second interface (not explicitly shown, but implied). As described above, the second interface may be the same as or different from the first interface.

The accelerator module 530 may be the accelerator module according to example embodiments. For example, the accelerator module 530 may include a plurality of memory controllers (MC) 532, a plurality of processing units (PU) 534, a managing circuit (MNG) 536 and a plurality of memories (MEM) 538.

Figure 18:
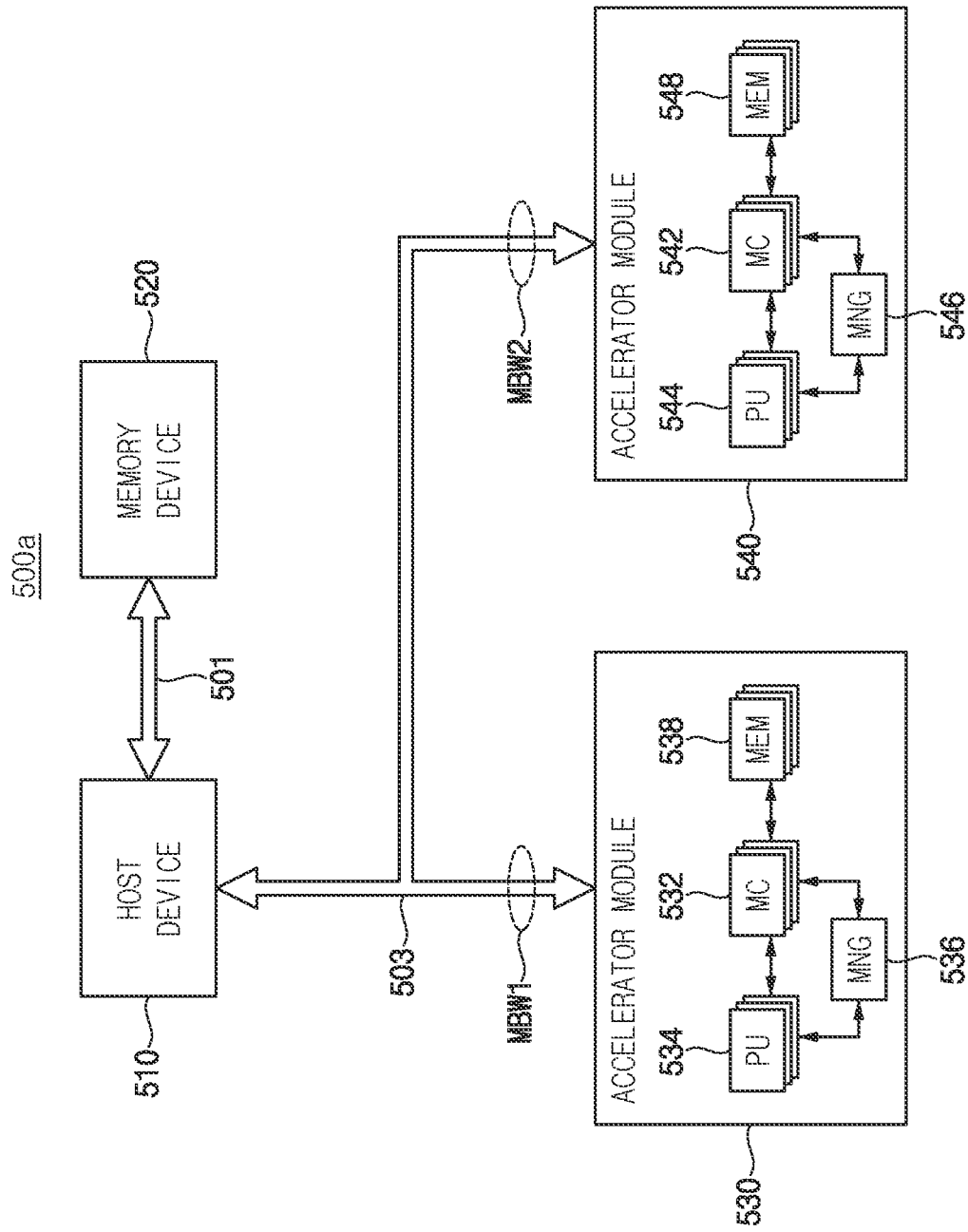

Referring to FIG. 18, a computing system 500a may include a host device 510, a memory device 520 and first and second accelerator modules 530 and 540, respectively. The computing system 500a may further include a first bus 501 and a second bus 503. The memory device 520 may be connected to the host device 510 through the first bus 501. The first and second accelerator modules 530 and 540 may be connected to the host device 510 through the second bus 503.

The computing system 500a may be substantially the same as the computing system 500 of FIG. 17, except that the computing system 500a further includes the second accelerator module 540. The second accelerator module 540 may be substantially the same as the first accelerator module 530, and may be the accelerator module according to example embodiments. For example, the second accelerator module 540 may include a plurality of memory controllers 542, a plurality of processing units 544, a managing circuit 546 and a plurality of memories 548. Although two accelerator modules are included in the example computing system 500a of FIG. 18, it is to be understood that embodiments of the inventive concept are not limited thereto, but may include more than two accelerator modules (e.g., three or more).

Figure 19:
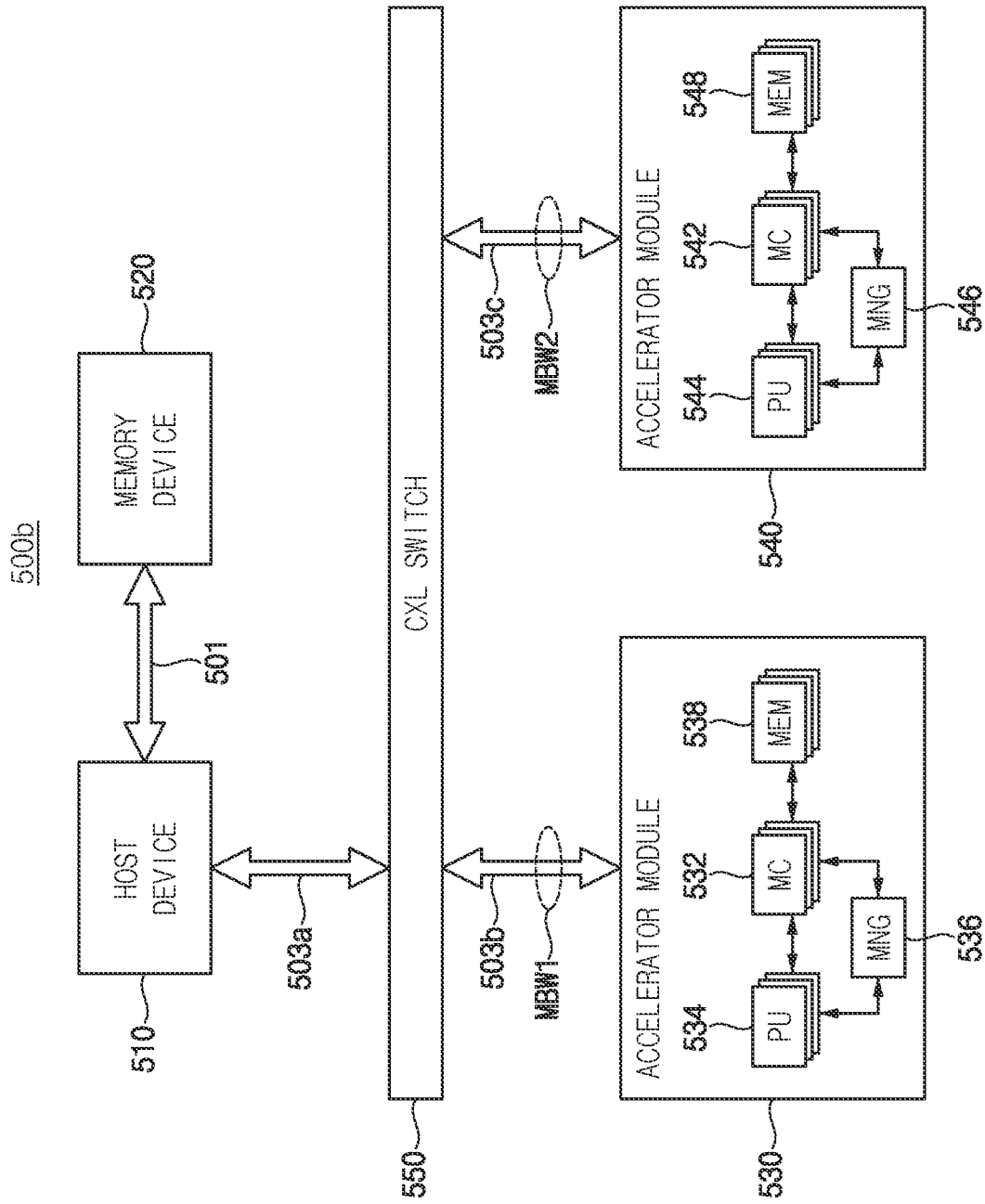

Referring to FIG. 19, a computing system 500b includes a host device 510, a memory device 520, first and second accelerator modules 530 and 540, respectively, and a switch 550. The computing system 500b may further include a first bus 501 and second buses 503*a*, 503*b* and 503*c*. The memory device 520 may be connected to the host device 510 through the first bus 501. The host device 510 may be connected to the switch 550 through the corresponding one of the second buses 503*a*. The first and second accelerator modules 530 and 540 may be connected to the switch 550 through the second buses 503*b* and 503*c*, respectively.

The computing system 500*b* may be substantially the same as the computing system 500*a* of FIG. 18, except that the computing system 500*b* further includes the switch 550 and the second buses 503*a*, 503*b* and 503*c* are partially changed.

The switch 550 may connect the host device 510 with the first and second accelerator modules 530 and 540 through the second buses 503*a*, 503*b*, and 503*c*. For example, when the second interface (i.e., the interface between the host device 510 and the first and second accelerator modules 530, 540) is the CXL interface, the switch 550 may be referred to as a CXL switch, but example embodiments are not limited thereto.

In some example embodiments, in the computing systems 500*a* and 500*b* of FIGS. 18 and 19, memory bandwidths MBW1 and MBW2 of the accelerator modules 530 and 540 may be dynamically/adaptively set. In other words, each of the accelerator modules 530 and 540 may perform the internal memory bandwidth control operation as described with reference to FIGS. 1 through 16, and an external memory bandwidth control operation for the accelerator modules 530 and 540 may be further performed. For example, the external memory bandwidth control operation may be performed based on the load balancing operation and/or the channel connection changing operation as described above. For example, a CXL multi-headed device may be divided into logical devices having different bandwidths.

Figure 20:
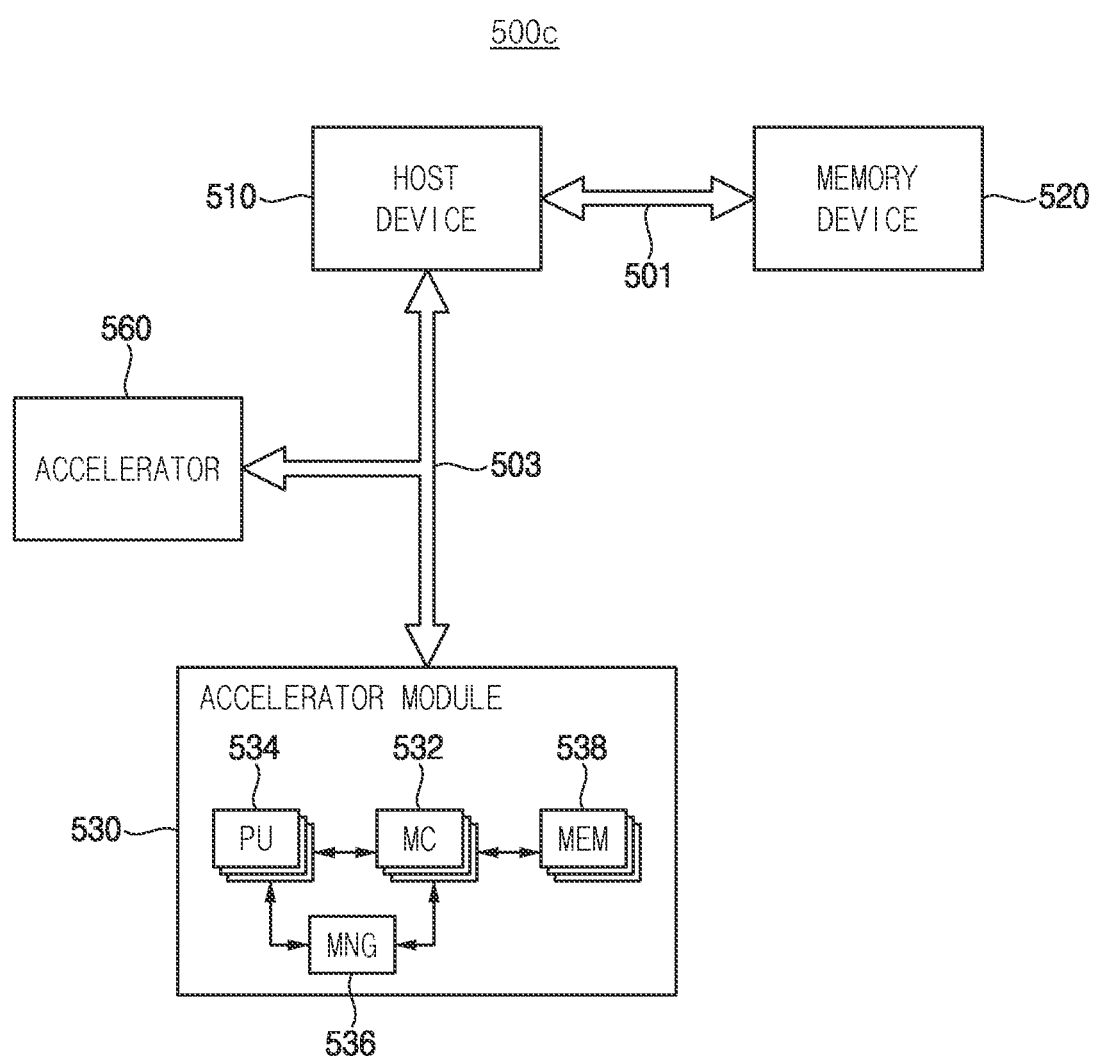

Referring to FIG. 20, an example computing system 500*c* according to one or more embodiments may include a host device 510, a memory device 520, an accelerator module 530 and an accelerator 560. The computing system 500*c* may further include a first bus 501, through which the host device 510 may be connected to the memory device 520, and a second bus 503, through which the host device 510 may be connected to the accelerator module 530 and the accelerator 560.

The computing system 500*c* may be substantially the same as the computing system 500 of FIG. 17, except that the computing system 500*c* further includes the accelerator 560.

The accelerator 560 may be connected to the host device 510 and the accelerator module 530 through the second bus 503, and may communicate with the host device 510 and the accelerator module 530 through the second bus 503 and the second interface (not explicitly shown, but implied). For example, the accelerator 560 may include a processing unit having a type different from that of the processing unit included in the host device 510. For example, the accelerator 560 may include at least one of various processing units performing artificial intelligence (AI) computations, e.g., a graphic processing unit (GPU), a tensor processing unit (TPU), a neural processing unit (NPU), a vision processing unit (VPU), etc.

As described above, the memory device 520 and the accelerator module 530 may communicate with the host device 510 through different types of interfaces (or heterogeneous interfaces), and/or different types of processing units (or heterogeneous processing units) may be included in the computing system 500*c*, and thus the computing system according to example embodiments may be referred to as a heterogeneous computing system. The number of accelerator modules and/or accelerators included in the computing system may be variously determined according to example embodiments.

Figure 21:
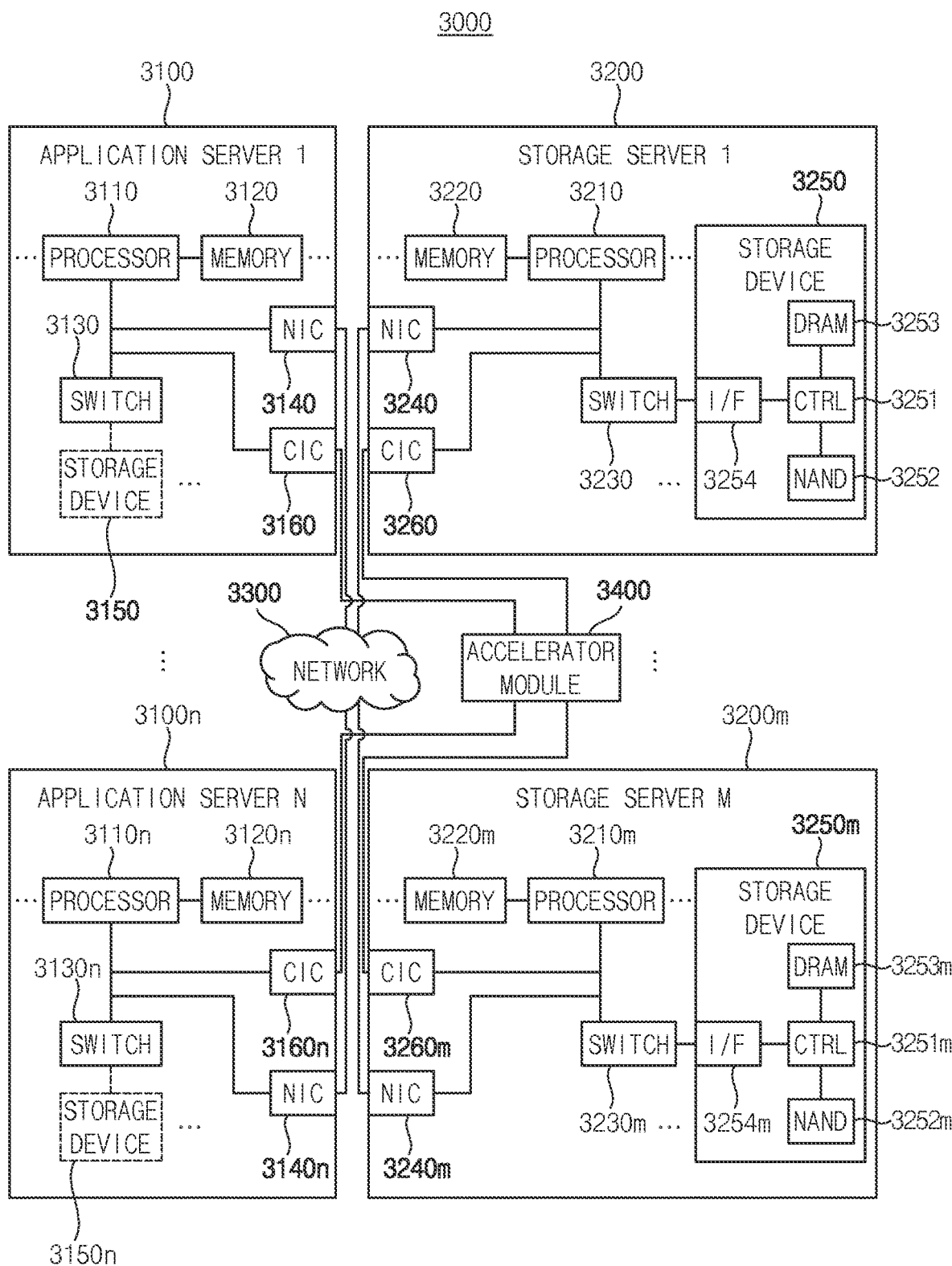
FIG. 21 is a block diagram illustrating at least a portion of an example data center including an accelerator module according to one or more embodiments.

FIG. 21 is a block diagram illustrating at least a portion of an example data center 3000 including an accelerator module according to one or more embodiments.

Referring to FIG. 21, the data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100*n* and storage servers 3200 to 3200*m*, where n and m are integers greater than one; n and m need not be the same, although they can be the same. The number of the application servers 3100 to 3100*n* and the number of the storage servers 3200 to 3200*m* may be variously selected according to example embodiments, and the number of the application servers 3100 to 3100*n* and the number of the storage servers 3200 to 3200*m* may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100*n* and the storage servers 3200 to 3200*m* may communicate with each other through a network 3300. The network 3300 may be implemented, for example, using a fiber channel (FC) or an Ethernet. The FC may be a medium used for a relatively high speed data transmission, and an optical switch that provides high performance and/or high availability may be used. The storage servers 3200 to 3200*m* may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general network such as the TCP/IP network. For example, the network 3300 may be implemented according to at least one of standard protocols such as an FC over Ethernet (FCOE), a network attached storage (NAS), a nonvolatile memory express (NVMe) over Fabrics (NVMe-oF), etc., or proprietary (i.e., non-standard) protocols.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 of the storage device 3250 may provide a physical connection between the processor 3210 and a controller 3251 of the storage device 3250, and a physical connection between the controller 3251 and a network interface connector (NIC) 3240 and/or a CXL interface controller (CIC) 3260 of the storage device 3250. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multimedia card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230, the NIC 3240 and the CIC 3260. The switch 3230 may selectively connect the processor 3210 with the storage device 3250 or may selectively connect the NIC 3240 and/or the CIC 3260 with the storage device 3250 under a control of the processor 3210. Similarly, the application server 3100 may further include a switch 3130, a NIC 3140 and a CIC 3160.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m of the storage devices 3250 and 3250m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 in the storage device 3250 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

The storage servers 3200 to 3200m and the application servers 3100 to 3100n may be connected to an accelerator module 3400 through the CICs 3160 to 3160m and 3260 to 3260m and the CXL interface. The accelerator module 3400 may be used as an expanded memory of each of the storage servers 3200 to 3200m and the application servers 3100 to 3100n. Each of the storage servers 3200 to 3200m and the application servers 3100 to 3100n may communicate with each other through the CXL interface and the accelerator module 3400.

The accelerator module 3400 may be the accelerator module according to example embodiments, and may be implemented as described with reference to FIGS. 1 through 20.

The example embodiments may be applied to various electronic devices and systems that include the accelerator modules. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

It will be understood that the terms "comprises" and/or "comprising," when used in this specification, specify the presence of stated features, steps, operations, elements, and/or components, but do not preclude the presence or addition of one or more other features, steps, operations, elements, components, and/or groups or combinations thereof. Spatially descriptive terms such as "above," "below," "upper" and "lower" (and similar language) may be used herein to indicate a position of circuits, elements, structures or features relative to one another as illustrated in the figures, rather than an absolute position.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An accelerator module, comprising:
a plurality of memories; and
a controller configured to control operations of the plurality of memories, and
wherein the controller includes:
a plurality of memory controllers connected to the plurality of memories, respectively, the plurality of memory controllers and the plurality of memories forming a plurality of memory sub-channels;
a plurality of processing units connected to the plurality of memory controllers, respectively, and configured to perform computational operations on a plurality of data stored in or read from the plurality of memories; and
a managing circuit connected to the plurality of processing units, and configured to redistribute tasks performed by the plurality of processing units or change connections between the plurality of memory controllers and the plurality of processing units in response to at least one of the plurality of memory sub-channels and/or one or more of the plurality of processing units being in a heavy-workload state.

2. The accelerator module of claim 1, wherein the plurality of memory sub-channels includes a first memory sub-channel, and the plurality of processing units includes a first processing unit connected to the first memory sub-channel, and wherein the managing circuit includes:
a plurality of load checkers connected to the plurality of processing units, respectively, and configured to check workloads of the plurality of processing units; and
a load balancer configured to distribute at least a portion of a workload of the first processing unit to at least one processing unit other than the first processing unit among the plurality of processing units in response to determining that the workload of the first processing unit is larger than a reference workload.

3. The accelerator module of claim 2, wherein the plurality of load checkers are configured to check access counts of the plurality of memory sub-channels connected to the plurality of processing units.

4. The accelerator module of claim 3,
wherein the plurality of memory sub-channels further includes a second memory sub-channel, and
wherein the load balancer is configured to determine that the workload of the first processing unit is larger than the reference workload in response to an access count of the second memory sub-channel becoming zero and in response to an access count of the first memory sub-channel being non-zero.

5. The accelerator module of claim 2,
wherein the plurality of processing units further includes a second processing unit, and
wherein the load balancer is configured to reallocate a first task among tasks allocated to the first processing unit to the second processing unit in response to determining that the workload of the first processing unit is larger than the reference workload.

6. The accelerator module of claim 5,
wherein the plurality of memory sub-channels further includes a second memory sub-channel connected to the second processing unit,
wherein first data associated with the first task and stored in the first memory sub-channel is copied to the second memory sub-channel, and
wherein the first task is performed using the second processing unit and the second memory sub-channel.

7. The accelerator module of claim 6, wherein an operation of copying the first data to the second memory sub-channel is performed under a control of an external host device or internally performed by the load balancer.

8. The accelerator module of claim 2, wherein the load balancer is configured to determine that the workload of the first processing unit is larger than the reference workload in response to a number of tasks allocated to the first processing unit being greater than a reference number.

9. The accelerator module of claim 1, wherein the managing circuit includes:
   an allocator configured to generate a connection control signal for controlling the connections between the plurality of memory controllers and the plurality of processing units; and
   a connector between the plurality of memory controllers and the plurality of processing units, and configured to connect each of the plurality of processing units with at least one of the plurality of memory controllers based on the connection control signal.

10. The accelerator module of claim 9,
    wherein the plurality of memory sub-channels includes a first memory sub-channel and a second memory sub-channel,
    wherein the plurality of processing units includes a first processing unit connected to the first memory sub-channel, and
    wherein the allocator is configured to generate the connection control signal to additionally connect the second memory sub-channel with the first processing unit in response to determining that a workload of the first processing unit is larger than a reference workload.

11. The accelerator module of claim 10, wherein the controller further includes:
    a direct memory access (DMA) engine configured to copy first data stored in the first memory sub-channel to the second memory sub-channel.

12. The accelerator module of claim 11,
    wherein the plurality of processing units further includes a second processing unit,
    wherein the plurality of memory sub-channels further includes a third memory sub-channel, and
    wherein the allocator is configured to generate the connection control signal to connect the second processing unit, which was previously connected to the second memory sub-channel, with the third memory sub-channel.

13. The accelerator module of claim 12, wherein the DMA engine is configured to copy at least a portion of second data stored in the second memory sub-channel to the third memory sub-channel.

14. The accelerator module of claim 11, wherein the controller further includes:
    an address converter configured to change address mapping information based on the connection control signal.

15. The accelerator module of claim 14, wherein the address converter is configured to change the address mapping information to access the first data stored in the second memory sub-channel rather than the first data stored in the first memory sub-channel when the first data is to be accessed by an external host device.

16. The accelerator module of claim 14, wherein the controller further includes:
    a plurality of multiplexers configured to connect one of the plurality of processing units and the address converter with the plurality of memory controllers.

17. The accelerator module of claim 9, wherein the connection control signal is generated under a control of an external host device or internally generated by the allocator.

18. A computing system, comprising:
    a host device;
    a memory device configured to communicate with the host device through a first interface; and
    a first accelerator module configured to communicate with the host device through a second interface,
    wherein the first accelerator module includes:
       a plurality of memories; and
       a controller configured to control operations of the plurality of memories, and
    wherein the controller includes:
       a plurality of memory controllers connected to the plurality of memories, respectively, the plurality of memory controllers and the plurality of memories forming a plurality of memory sub-channels;
       a plurality of processing units connected to the plurality of memory controllers, respectively, and configured to perform computational operations on a plurality of data stored in or read from the plurality of memories; and
       a managing circuit connected to the plurality of processing units, and configured to redistribute tasks performed by the plurality of processing units or change connections between the plurality of memory controllers and the plurality of processing units in response to at least one of the plurality of memory sub-channels and/or one or more of the plurality of processing units being in a heavy-workload state.

19. The computing system of claim 18, further comprising:
    a second accelerator module configured to communicate with the host device through the second interface,
    wherein the computing system is configured to change bandwidths of the first and second accelerator modules in response to the first accelerator module being in the heavy-workload state.

20. An accelerator module, comprising:
    a plurality of memories; and
    a controller configured to control operations of the plurality of memories,
    wherein the controller includes:
       a plurality of memory controllers connected to the plurality of memories, respectively, the plurality of memory controllers and the plurality of memories forming a plurality of memory sub-channels, and the plurality of memory sub-channels including a first memory sub-channel, a second memory sub-channel and a third memory sub-channel;
       a plurality of processing units connected to the plurality of memory controllers, respectively, and configured to perform computational operations on a plurality of data stored in or read from the plurality of memories, the plurality of processing units including a first processing unit connected to the first memory sub-channel and a second processing unit connected to the second memory sub-channel; and
       a managing circuit connected to the plurality of processing units, and configured to perform at least one of a load balancing operation and a channel connection reconfiguration operation in response to the first memory sub-channel and the first processing unit being in a heavy-workload state,
    wherein, during the load balancing operation, the managing circuit is configured to reallocate a first task among tasks allocated to the first processing unit to the second processing unit, to copy first data associated with the first task and stored in the first memory sub-channel to the second memory sub-channel, and to perform the first task using the second processing unit and the second memory sub-channel, and wherein, during the channel connection reconfiguration operation, the managing circuit is configured to additionally connect the second memory sub-channel with the first processing unit, to copy the first data stored in the first memory sub-channel to the second memory sub-channel, to connect the second processing unit, which was previously connected to the second memory sub-channel, with the third memory sub-channel, to copy second data stored in the second memory sub-channel to the third memory sub-channel, and to change address mapping information to access the first data stored in the second memory sub-channel rather than the first data stored in the first memory sub-channel when the first data is to be accessed by an external host device.

* * * * *